June 22, 1943.      C. J. CRANE ET AL      2,322,225
AIRCRAFT AUTOMATIC TAKE-OFF, FLIGHT AND LANDING
Filed July 29, 1939      10 Sheets-Sheet 4
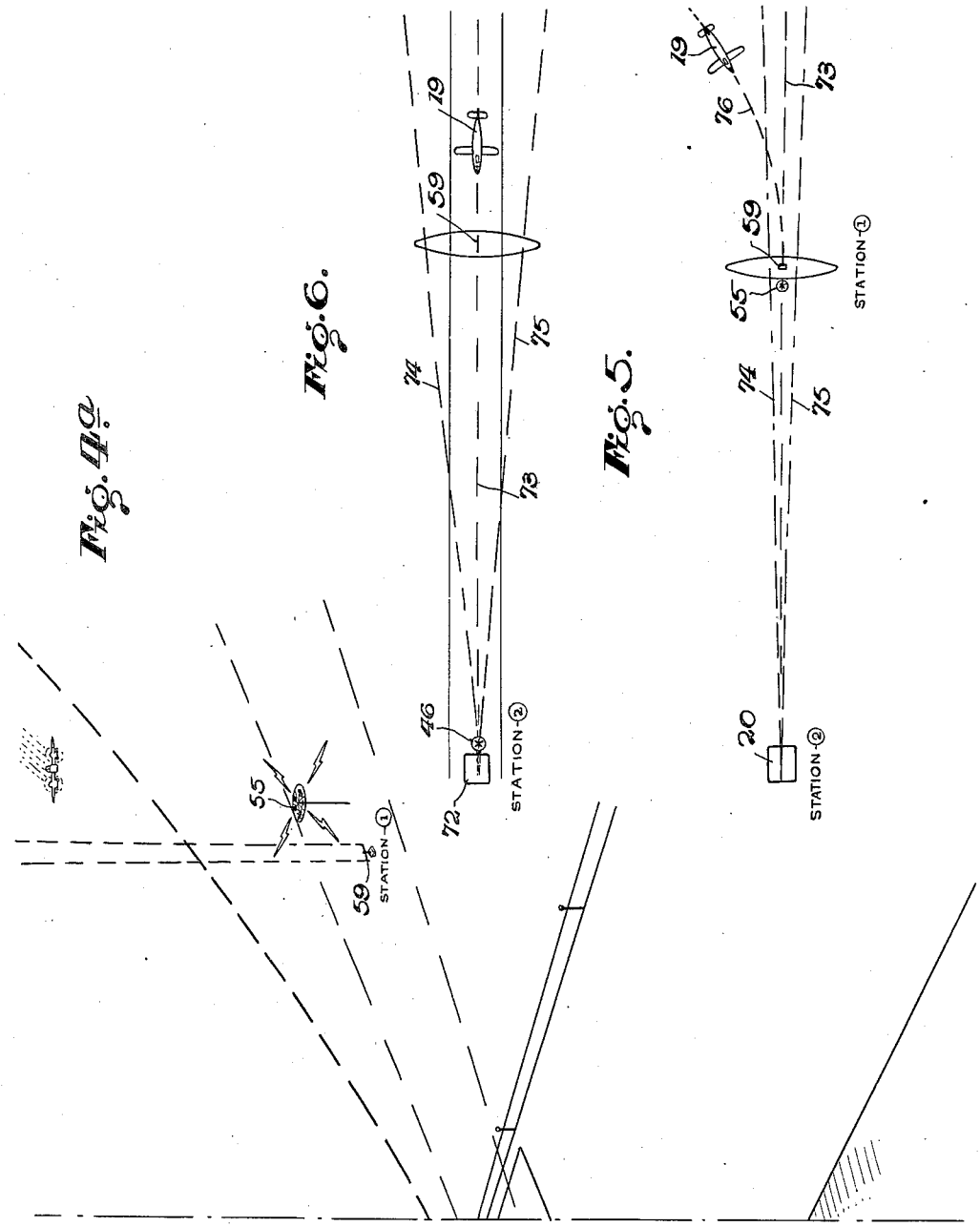
Inventors
Carl J. Crane
George V. Holloman
Raymond K. Stout
Constantin D. Barbulesco
By
Attorneys

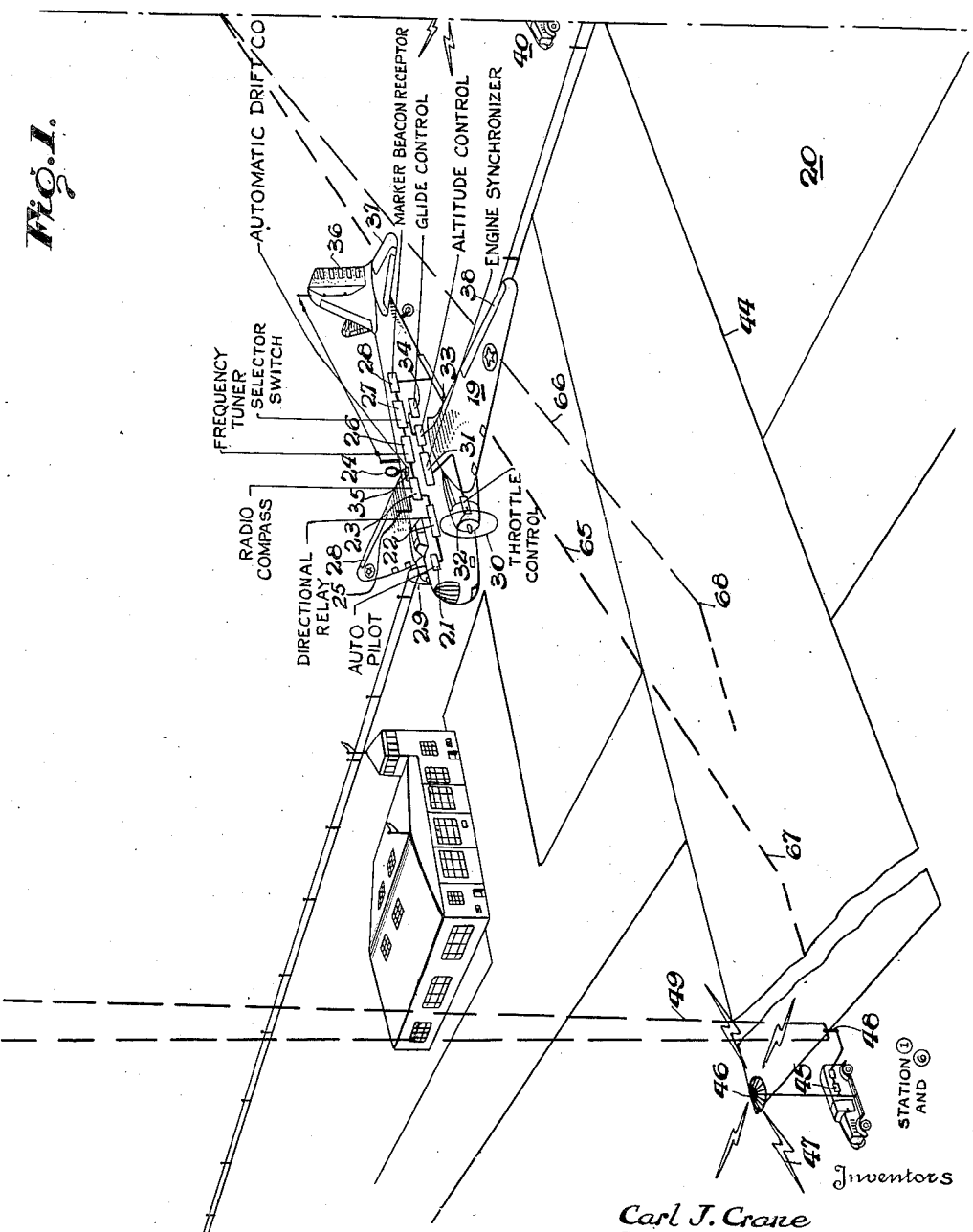

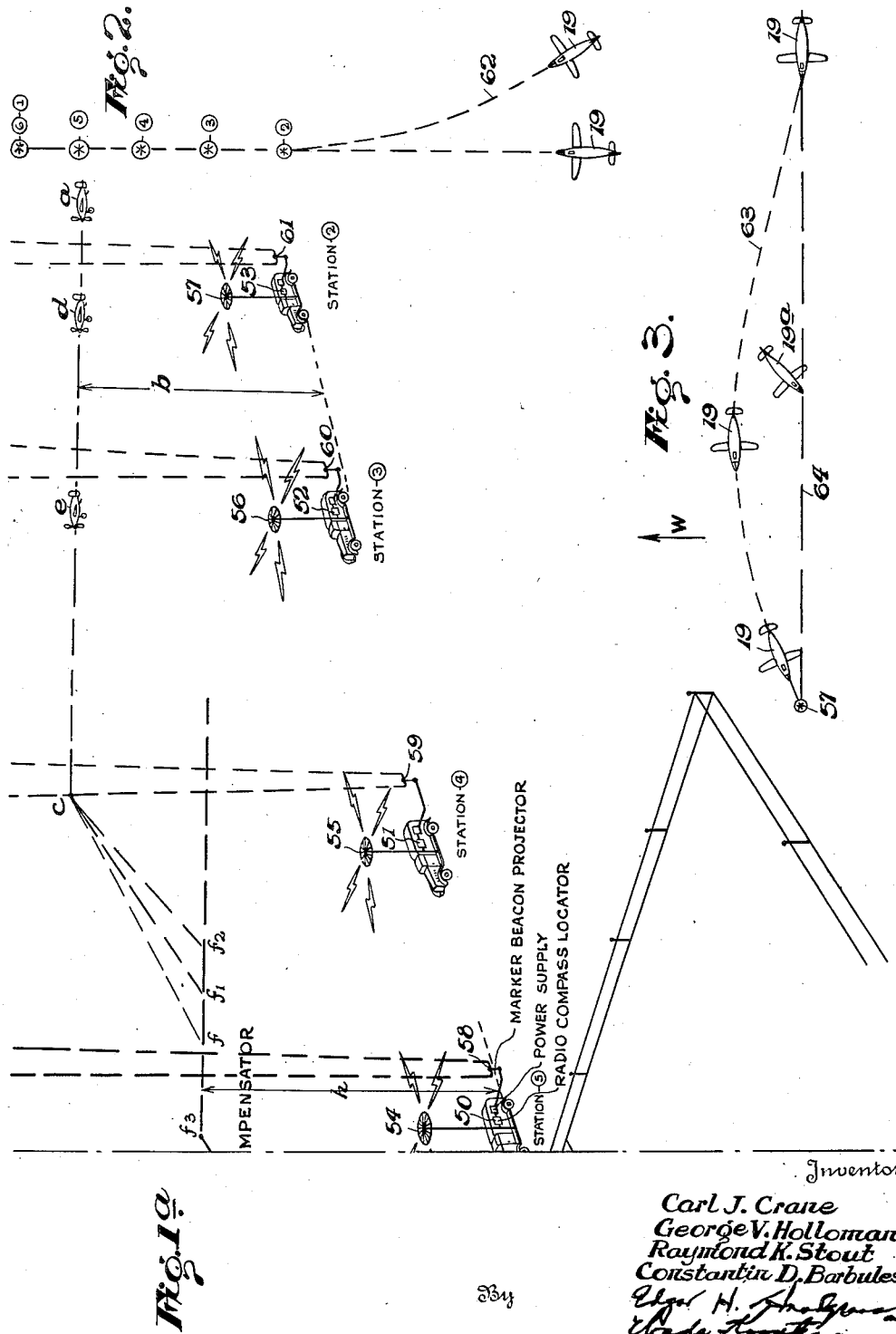

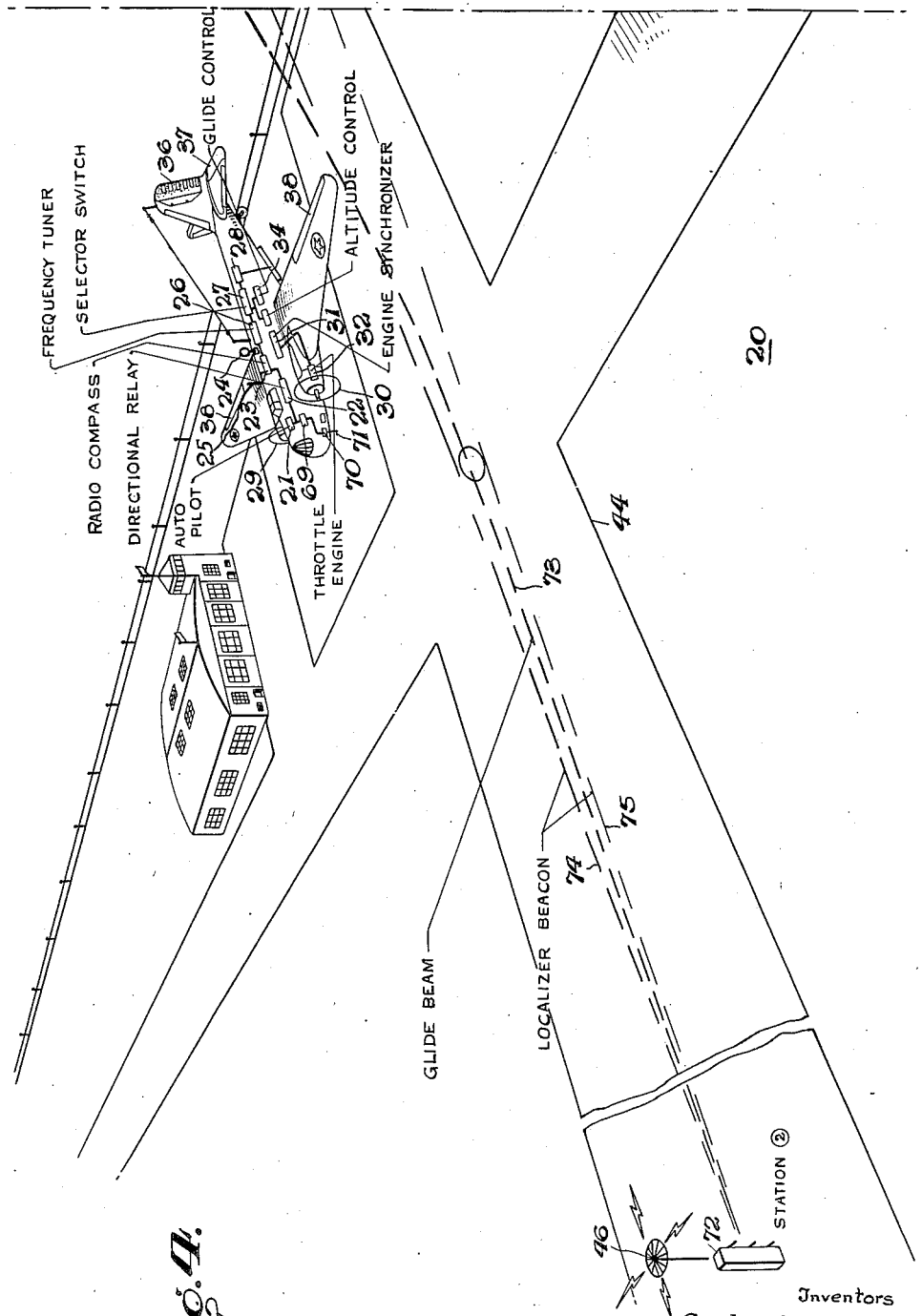

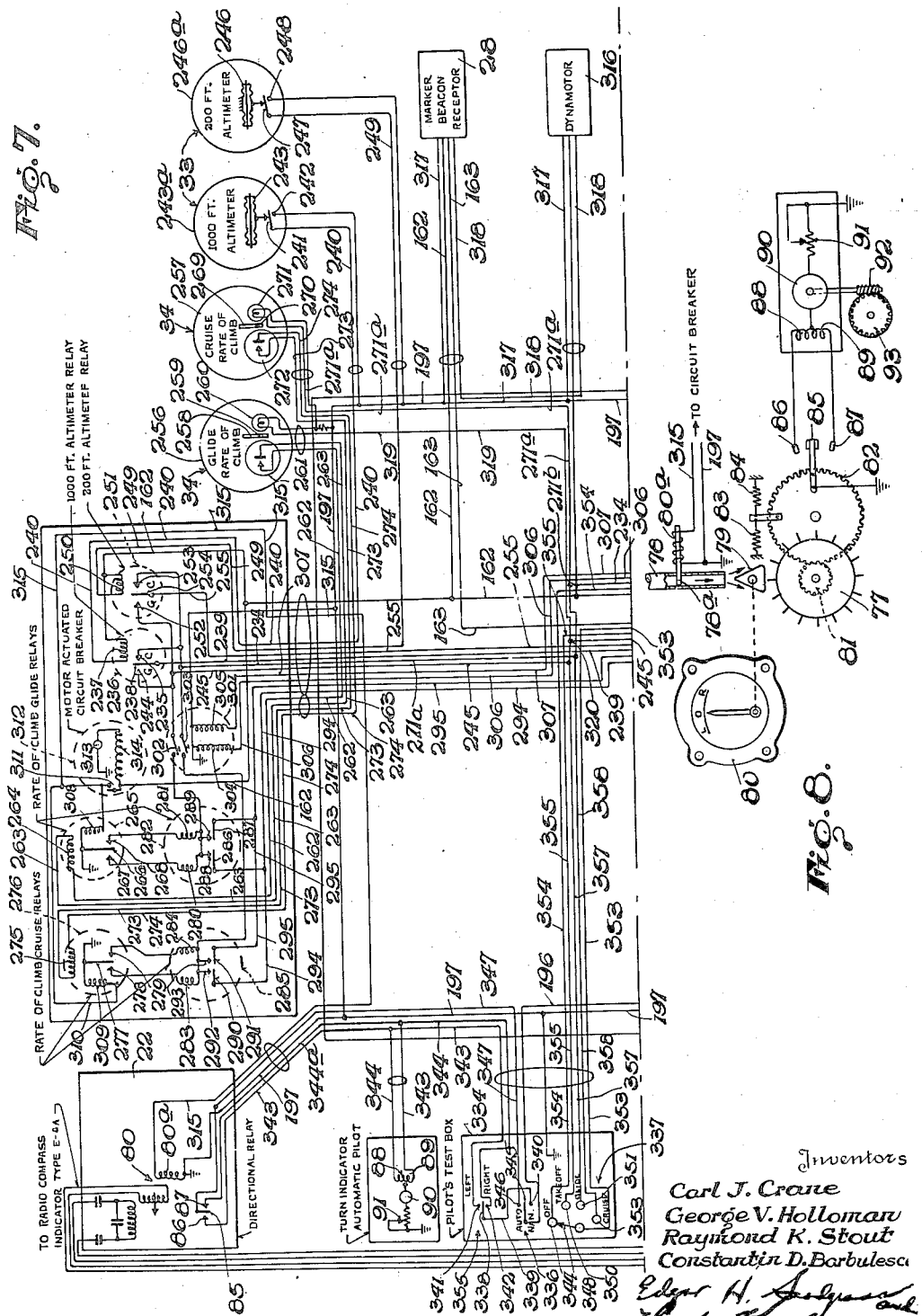

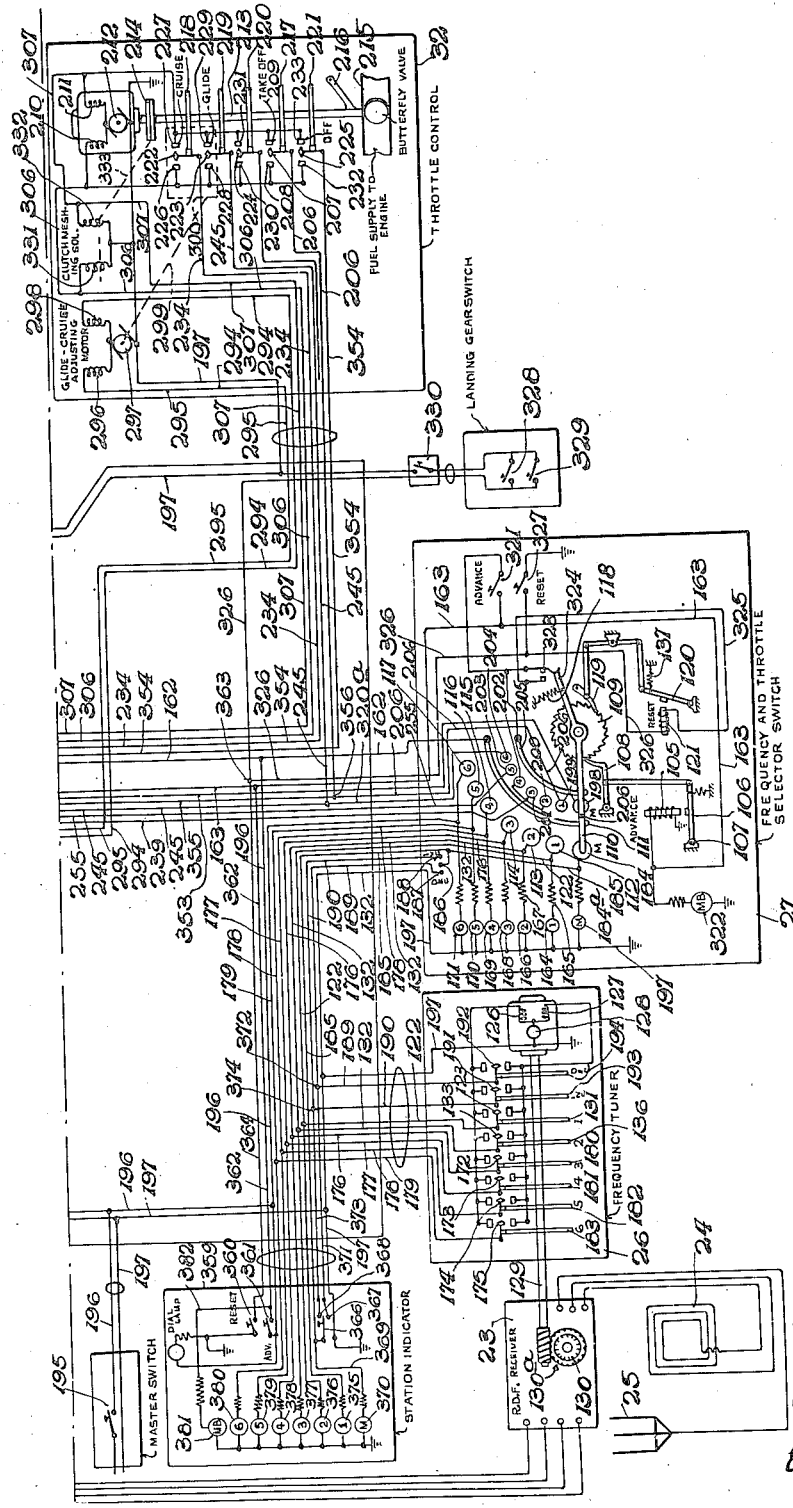

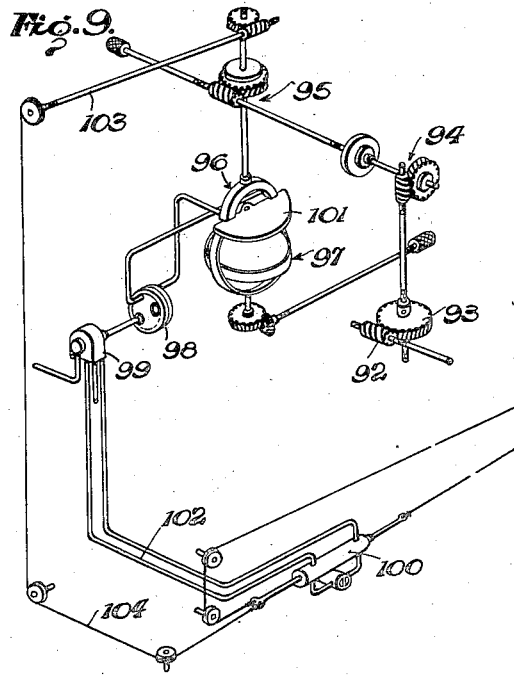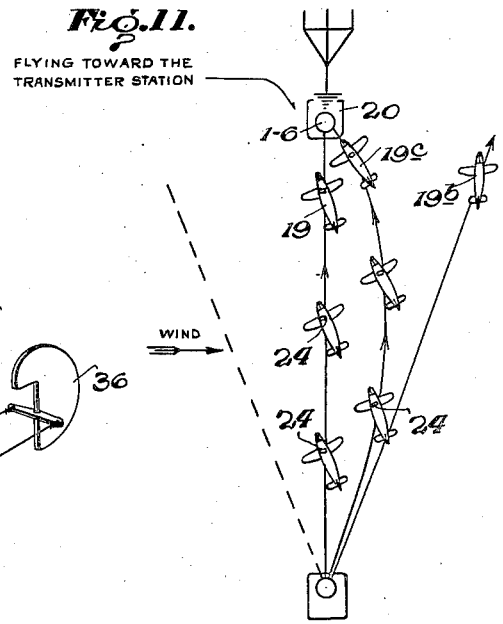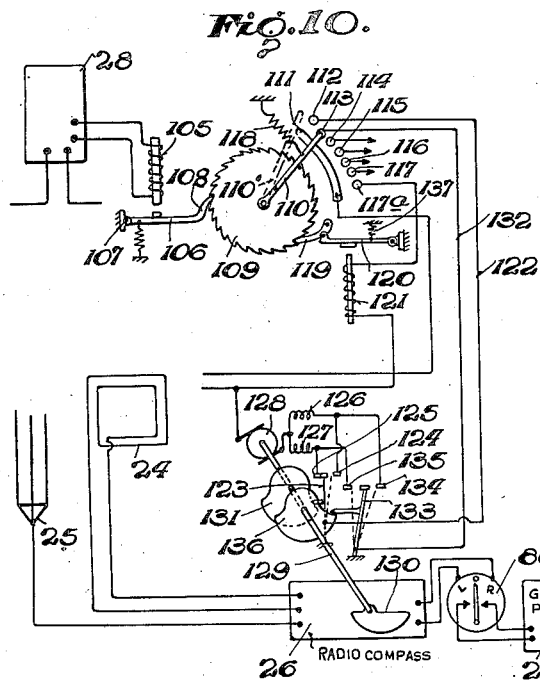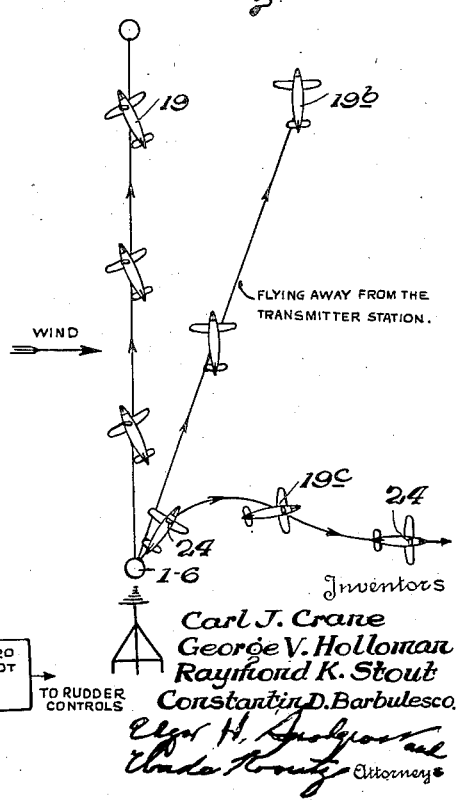

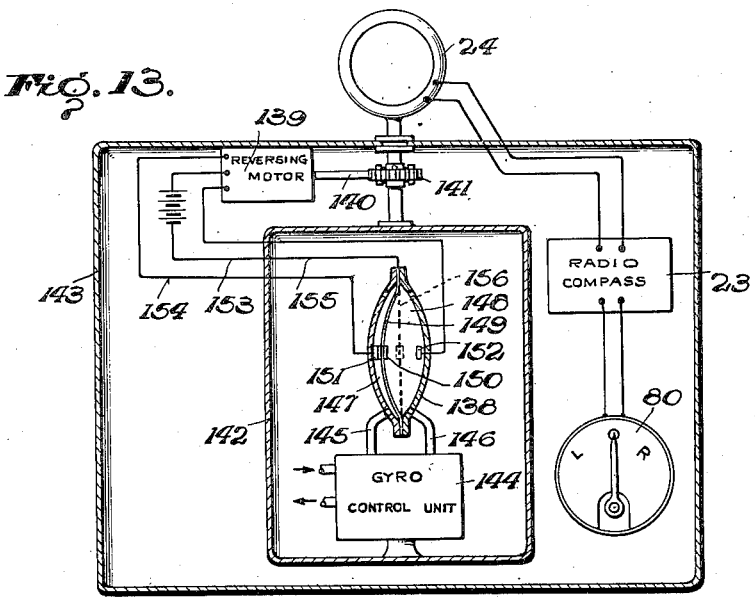
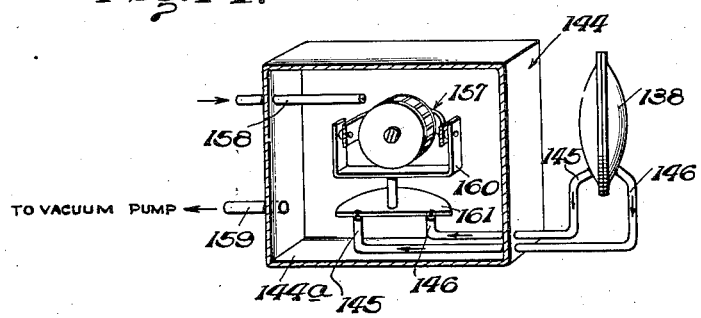
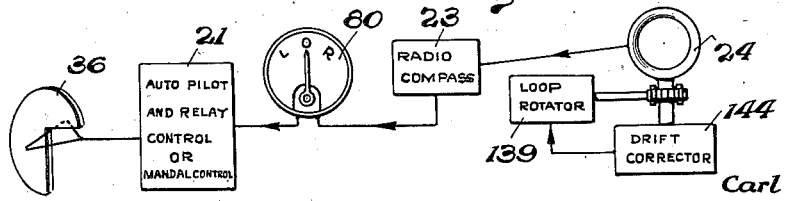

June 22, 1943. C. J. CRANE ET AL 2,322,225
AIRCRAFT AUTOMATIC TAKE-OFF, FLIGHT AND LANDING
Filed July 29, 1939 10 Sheets-Sheet 9

Inventors
Carl J. Crane
George V. Holloman
Raymond K. Stout
Constantin D. Barbulesco.

Attorneys

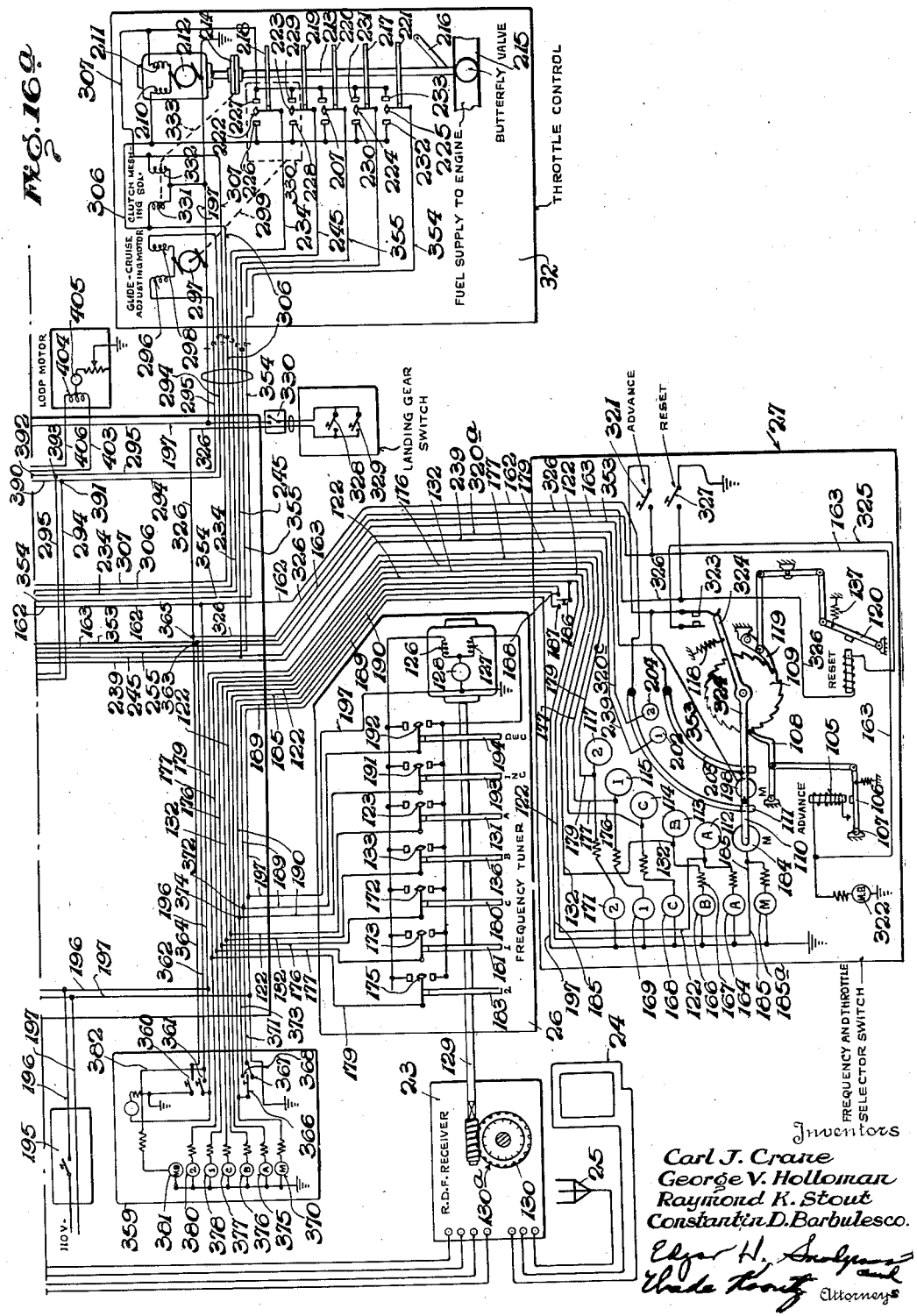

Patented June 22, 1943

2,322,225

UNITED STATES PATENT OFFICE 2,322,225

AIRCRAFT AUTOMATIC TAKE-OFF, FLIGHT, AND LANDING

Carl J. Crane, George V. Holloman, and Raymond K. Stout, Dayton, and Constantin D. Barbulesco, Yellow Springs, Ohio Application July 29, 1939, Serial No. 287,310

20 Claims. (Cl. 244—77)

(Granted under the act of March 3, 1883, as amended April 30, 1928; 370 O. G. 757)

The invention described herein may be manufactured and used by or for the Government for governmental purposes, without the payment to us of any royalty thereon.

The present invention relates to apparatus for effecting automatic take-off, automatic flight and automatic landing of aircraft.

One of the objects of the invention is to provide a novel combination of means whereby an aircraft may take off automatically, continue in automatic flight on a predetermined course, and then land automatically at a predetermined landing field entirely without the aid of a human pilot.

Another object is to provide a novel combination of automatically operable means for simplifying the flight of an aircraft during take-off, during cruising flight and during landing.

Another object is to provide a novel combination of radio-responsive automatically-operable means for effecting automatic take-off and flight, and automatic landing of an aircraft at a predetermined landing field.

A further object of the invention is to provide a novel combination comprising radio-responsive automatically-operable means for effecting automatic take-off and flight and automatic landing of an aircraft at a predetermined landing field, and manually operable means for controlling the automatically-operable means, whereby semi-automatic control of take-off, flight and landing of the aircraft may be effected.

Still another object of the invention is to provide novel apparatus for automatic control of an aircraft during take-off, flight and landing, comprising, in combination with the aircraft, automatically operable means on said aircraft for controlling said aircraft about the three axes thereof, radiant energy transmitting means remote from said aircraft, means on said aircraft for controlling the altitude of said aircraft, means responsive to deviations of the craft from a predetermined course, and means responsive to radiant energy received from the remote transmitting means for controlling the altitude controlling means and the deviation responsive means.

A still further object of the invention is to provide novel apparatus for automatically controlling an aircraft during take-off, flight and landing, comprising, in combination with said aircraft, a plurality of radio transmitting stations on the ground spaced in alignment along a predetermined line of flight to be followed by the aircraft during take-off and/or landing, certain of the transmitting stations being provided with means for transmitting radiant energy directively in a vertical direction and non-directive means for transmitting radiant energy in all directions, the non-directive radiant energy transmitted by each of the certain stations having a frequency different from that transmitted by each of the other certain stations, means on said aircraft for maintaining level flight, means on said aircraft for maintaining it on a predetermined course, means on said aircraft for controlling the altitude thereof to a predetermined altitude, means responsive to the non-directively transmitted radiant energy for controlling the course maintaining means, and selecting means sequentially responsive to the vertically-transmitted radiant energy from each of said certain stations for controlling the first-mentioned radiant energy responsive means and the altitude controlling means to simultaneously preselect a predetermined altitude at which the aircraft is to fly, and to sequentially tune to a different predetermined frequency the means responsive to the non-directively transmitted radiant energy, whereby the aircraft is guided from one to the other of the transmitting stations at a decreasing altitude until the aircraft contacts the ground.

A still further object of the invention is to provide in combination with an aircraft, an automatic pilot for stabilizing the craft about its three axes, radio direction finding means, altitude responsive control means, rate-of-change-of-altitude responsive control means, propulsive power means for maintaining the craft in flight, and radio-responsive control means responsive to radiant energy transmitted from a plurality of points on the ground for controlling all of said means to guide the aircraft along a predetermined line of flight and at a predetermined altitude.

The above and other objects and advantages of the invention will appear more fully hereinafter from a consideration of the detailed description which follows, taken together with the accompanying drawings wherein two embodiments of the invention are illustrated. It is to be expressly understood, however, that the drawings are for purposes of illustration and description only and are not to be construed as defining the limits of the invention, reference being had to the appended claims for this purpose.

In the drawings, wherein like reference characters refer to like parts throughout the several views:

Figs. 1 and 1a are to be taken together, with Fig. 1 placed to the left of Fig. 1a, and are a pictorial diagram showing an aircraft about to make a landing with the aid of one form of apparatus embodying the invention, the various elements of the apparatus and their relation to each other being shown diagrammatically both on the aircraft and on the ground;

Fig. 2 is a diagram showing two paths which the aircraft may take in approaching the landing field;

Fig. 3 is a diagram showing the direction of a cross wind and two paths which the aircraft may take in approaching the landing field, one path being that taken by the aircraft when it is provided with a drift corrector, and the other path being that taken by the aircraft when no drift corrector is used;

Figs. 4 and 4a are to be taken together, with Fig. 4 placed to the left of Fig. 4a, and are a pictorial diagram showing an aircraft coming in for a landing with the aid of another form of apparatus incorporating another embodiment of the invention, the various elements of the apparatus and their relation to each other being shown diagrammatically both on the aircraft and on the ground;

Fig. 5 is a diagram showing the runway localizer beam when the second embodiment of the invention is employed, and the path of the aircraft in approaching the landing field just before it begins to be guided by the localizer beam;

Fig. 6 is another diagram showing the runway localizer beam of Fig. 5, and the path of the aircraft as it is guided by the localizer beam;

Figs. 7 and 7a are to be taken together, with Fig. 7 placed above Fig. 7a, and comprise the wiring diagram of the first embodiment of the invention shown in Figs. 1 and 1a;

Fig. 8 is a diagrammatic view showing the details of one form of radio responsive directional relay used in both embodiments of the invention;

Fig. 9 is a perspective view showing diagrammatically the manner in which the automatic pilot is controlled by the radio responsive directional relay of Fig. 8;

Fig. 10 is a diagrammatic view of one embodiment of a selector switch forming part of the invention for selectively tuning the radio direction finder in response to radiant energy received from a marker beacon on the ground;

Figure 16:
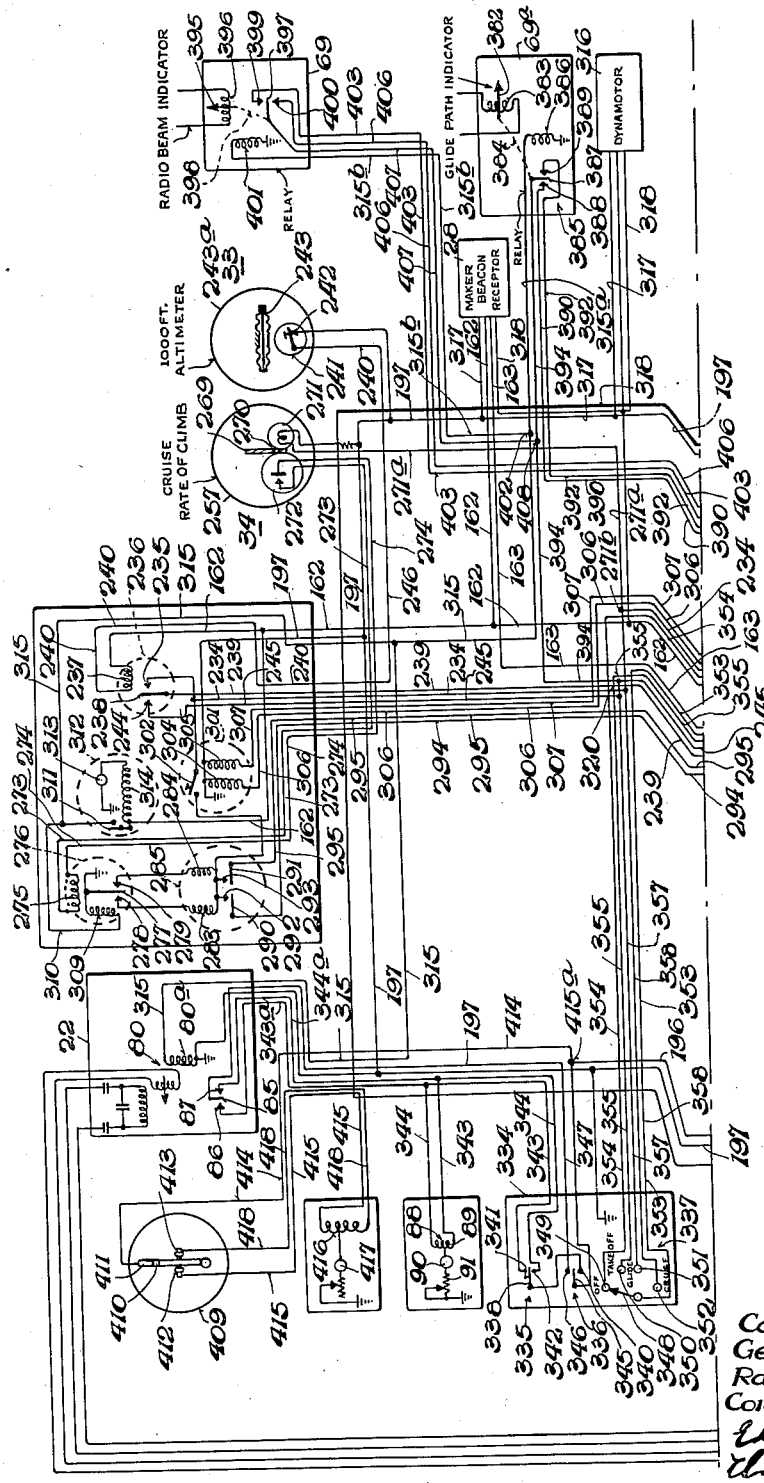

Fig. 11 is a diagram showing three paths of flight taken by an aircraft flying toward a radio transmitting station, one path being that of an aircraft provided with an automatic pilot only, the second path being that of an aircraft provided with an automatic pilot controlled by a radio direction finder, and the third path being that of an aircraft provided with an automatic pilot controlled by a radio direction finder provided with a gyroscopic drift corrector used in the apparatus of the present invention;

Fig. 12 is a diagram showing three paths of flight taken by aircraft away from a radio transmitting station, the aircraft being equipped with the same control systems as described with respect to Figure 11;

Fig. 13 is a sectional view showing the means for rotating the radio loop which is electrically connected to the radio compass which in turn is electrically connected to the left-right indicator;

Fig. 14 is a diagrammatic isometric view of the gyro control unit of Fig. 13;

Fig. 15 is a line diagram showing the operational relation between the radio compass, automatic pilot and gyroscopic drift corrector; and Figs. 16 and 16a, to be taken together with Fig. 16 placed above Fig. 16a, comprise the wiring diagram of the second embodiment of the invention shown in Figs. 4 and 4a.

The invention consists substantially in the construction, combination, location and relative arrangement of parts and circuits for obtaining the results desired in accordance with the hereinbeforestated objects, as will be more fully hereinafter set forth in the specification, as shown in the drawings, by way of example, and as finally pointed out in the claims.

Referring now to the drawings and first to Figs. 1 and 1a thereof, there is shown an aircraft 19 which is about to land on the landing field 20 in accordance with the present invention and with the aid of one form of apparatus embodying the invention. The aircraft is provided with an automatic pilot shown diagrammatically at 21 for controlling the craft in flight about all three of its axes and, in the present instance, is of the type shown in the patent to E. A. Sperry, Jr., et al., No. 1,992,970, dated March 5, 1935. The direction controlling means of the automatic pilot 21 are connected to a directional relay 22 which is controlled by a radio compass 23 including a loop antenna 24 and a straight antenna 25. The directional relay 22 is of the type disclosed in our co-pending application, Serial No. 95,042, filed August 8, 1936. The radio compass 23 is adapted to be tuned to any one of a plurality of predetermined frequencies by means of a frequency tuner 26. The frequency tuner is controlled by a frequency and throttle selector switch 27 in a manner which will be explained more fully hereinafter, in response to an impulse received by radio marker beacon receptor 28.

In the present instance, the aircraft 19 is shown as having two engines 29 and 30 which are maintained at the same speed by means of an engine synchronizer 31 of any suitable type such, for example, as that shown in the patent to W. S. Berry, No. 2,066,819, dated January 5, 1937. The invention is applicable, however, to a single-engined aircraft, in which event the engine synchronizer 31 need not be provided.

The aircraft is provided with an automatic throttle control 32 for controlling the speed of the engines to thereby control the altitude of the aircraft, since if the aircraft is maintained in level flight, increase or decrease of the power output of the engine or engines will respectively cause the aircraft to ascend or descend. The throttle control is actuated in response to radiant energy received by the marker beacon receptor 28 which controls the frequency selector switch to actuate the throttle through the throttle control to a desired position at desired times, and in response to changes in altitude as determined by an altitude responsive control mechanism 33, and also in response to rate-of-change-of-altitude as determined by a rate-of-change-of-altitude responsive control device 34.

The loop antenna 24 of the radio compass 23 is provided with an automatic drift compensator 35 which, in the present instance, is of the type disclosed in our co-pending application, Serial No. 214,560, filed June 18, 1938.

The automatic pilot 21 controls the rudder 36 to maintain the craft on a predetermined course, and also controls the elevator 37 and ailerons 38 to maintain the craft in level flight, and in accordance with the present invention the aircraft is continuously maintained in level flight until it lands on the ground at the landing field.

On the ground at and in the vicinity of the field from which the aircraft is to take off or on which it is to land there are provided a plurality of mobile radio transmitting stations which are spaced apart and aligned in the direction of flight of the aircraft during take-off and during landing. As illustrated there are five such mobile transmitting stations which are designated as stations 1, 2, 3, 4, 5 and 6, the stations 1 and 6 being the same station at the end of the runway 44 at the landing field 20, while station 5 is at the beginning of the runway 44, and stations 4, 3 and 2 being progressively spaced further from the field 20 and runway 44 but in alignment with stations 1, 6 and 5. The furthermost station 2 is approximately fifteen miles from the landing field 20. The transmitting stations 1, 6, 5, 4, 3 and 2 are shown as being mounted on respective trucks so that they may be lined up in any desired direction with respect to the landing field 20 to guide the aircraft into the landing field along a desired runway depending upon the direction of the wind, it being well known that a heavier-than-air aircraft must take off and land into the wind. However, the transmitting stations may be permanently fixed in their locations, if desired, but in such event it would be necessary to have several sets of stations as, for example, one set for each cardinal point of the compass so that an aircraft could take off or land in any one of the four compass directions—namely, north, south, east or west and substantially against the wind even though the exact direction of the wind might not be along a cardinal point of the compass.

At each of the transmitting stations, 1—6, 5, 4, 3 and 2 there is provided a radio transmitter which transmits radiant energy in substantially all directions, and a radio marker beacon projector which transmits radiant energy directively in a vertical direction in the form of a fan-shaped beam. Thus, the station 1—6 is provided with a transmitter 45 including an antenna 46 which radiates energy in all directions as indicated at 47, and a radio marker beacon transmitter and antenna unit 48 which transmits radiant energy vertically as shown at 49. At the stations 5, 4, 3 and 2 are likewise shown the transmitters 50, 51, 52 and 53, respectively, which include the antennae 54, 55, 56 and 57 respectively, while the radio marker beacon projectors at stations 5, 4, 3 and 2 are shown at 58, 59, 60 and 61, respectively.

The manner in which an automatic landing of the aircraft is effected, in accordance with the invention and with the aid of the aforementioned apparatus, is as follows:

In Figs. 1 and 1a, assume that the aircraft 19 has arrived at the point a either under manual control or under the control of the automatic pilot 21. Upon reaching this point the aircraft will be placed under automatic control of the previously mentioned control devices, as by closing a master switch which will be described later. Upon closing of the master switch when the aircraft is at point a, the altitude responsive control device 33 will cause the aircraft to attain a predetermined altitude as, for example, an altitude of one thousand feet, if the aircraft is not already at that altitude, by reducing or increasing the propulsive power of the aircraft through the interaction of the automatic throttle control 32 and associated rate-of-change-of-altitude control 34, the latter being hereinafter called the glide control.

Having attained the correct altitude indicated at b, the aircraft maintains this altitude through the action of the altitude responsive control 33 and proceeds along the line ac without further gain or loss of altitude. This line ac, although having characteristics of constant altitude may be a curvilinear path as shown in Fig. 2 because when the automatic control of the aircraft begins to function, the heading of the aircraft may be other than towards the transmitting station 2. In order that the aircraft may have its path controlled in direction when operating automatically, it is necessary for the action of the radio transmitter 53 at station 2 to influence the automatic pilot 21 in a manner which introduces a corrective factor into the directional element, such as the directional gyro of the automatic pilot, in the manner shown in our above-mentioned co-pending application Serial No. 95,042 to cause a setting of the directional gyro in order that the aircraft be directed to and over the transmitting station 2. Consequently, at a given time in the flight of the aircraft the latter will arrive over the transmitting station 2 and will at the same time pass through the radiated beam projected from the marker beacon 61 since the transmitter 53 and marker beacon 61 are closely associated physically. At this moment, the aircraft will be at the point d in the path ac.

When the aircraft arrives at the point d at the controlled elevation b, the radio compass 23 has its frequency selected and changed to the frequency of radio transmitter 52 at the next station 3 by the operation of the frequency tuner 26 and the frequency selector switch 27 in response to a radio impulse received by the marker beacon receptor 28 from the marker beacon 61. Thus, the radio compass 23 will now be tuned to the frequency of the transmitter 52 at station 3, thereby controlling the automatic pilot 21 through the directional relay 22 to guide the aircraft from station 2 to station 3. Therefore, at a given time in the flight of the aircraft over the path ac, it will arrive over the transmitting station 3 at the point e at the controlled altitude b and the controlled direction along the path ac.

Referring at this time to Fig. 2 the heading of the aircraft may not be such that it will proceed naturally along the line joining the various transmitting stations from 2 to 6 but may be at some heading as indicated by the curved path 62 due to the elements of wind and other factors affecting the path of approach of the aircraft after passing over the transmitting station 2. It is for this reason that five transmitting stations are employed although a greater or smaller number may be used, in order to establish a more desirable path for the aircraft to follow.

Reference is now made to Fig. 3 wherein are indicated two paths that may be followed by the aircraft depending upon whether or not a drift compensator is included as a part of the automatic control. The path indicated by the curved line 63 would be followed if the aircraft were operating without a drift compensator and with the wind having a component as shown by the arrow $w$. If, however, a drift compensator is used in conjunction with the automatic control as contemplated by the present invention, the path will be substantially as shown by the straight line 64 in which the heading of the aircraft would be essentially as shown at 19a in contradistinction to that shown while traveling along the curved path 63.

After leaving position $e$, the aircraft proceeds to the point $c$ where the beam from the marker beacon 59 produces an impulse in the marker beacon receptor 28 to actuate the frequency selector switch 27, thereby operating the frequency tuner 26 to tune the radio compass 23 to the frequency of the radio transmitter 50 at station 5. At this point $c$, however, the frequency and throttle selector switch simultaneously causes the automatic throttle control 32 to be actuated to decrease the propulsive power of the aircraft engines 29 and 30, thereby bringing the aircraft to a lower altitude $h$ as, for example, two hundred feet, just before the aircraft reaches point $f$ or $f_1$ or $f_2$ depending upon head wind and the strength thereof. With a slight head wind, for example, the aircraft would glide to the altitude $h$ at the point $f$. With a head wind of some magnitude the aircraft would reach the altitude $h$ at the point $f_1$, and with a fairly strong head wind the aircraft would reach the altitude $h$ at the point $f_2$.

Upon reaching the altitude $h$ the aircraft will be maintained at that altitude by the altitude responsive control means 33 which has been adjusted by the actuation of the selector switch 27 to control the propulsive power of the engines through the automatic throttle control to maintain the altitude $h$. The aircraft will now proceed at the altitude $h$ until it reaches the point $f_3$ at which time it will have passed through the radio beam projected by the marker beacon 58, this for the reason that upon reaching point $c$ the beam from the marker beacon 59 will produce an impulse in the marker beacon receptor 28 to actuate the selector switch and tune the radio compass through the frequency tuner 26 to the frequency of the radio transmitter 50 at the station 5. Upon passing through the beam from the marker beacon 58 another impulse will be received by the marker beacon receptor 28 to actuate the selector switch 27 and thereby tune the radio compass 23 through the frequency tuner 26 to the frequency of the radio transmitter 45 at the station 1—6 at the end of the runway 44 on the landing field 20. Simultaneously the selector switch 27 will cause actuation of the automatic throttle control to reduce the propulsive power of the aircraft engines 29 and 30 to bring the aircraft into a glide and also to cut out the altitude responsive control means 33. The aircraft will then glide along the path 65 or 66 depending upon whether there is a mild or strong head wind and will land along the runway 44 at the point 67 or 68 whereupon a switch on the landing gear will be actuated at the instant that the wheels touch the ground, and the closing of this switch will cause the automatic throttle control 32 to move the throttle to the "off" position, cutting off the fuel supply to the aircraft engines. With the power off, the aircraft will roll to a stop before reaching the end of the runway 44.

Referring to Figs. 4 and 4a, there is shown another embodiment of the invention, in which the various component elements of the apparatus are substantially the same as those shown in Figs. 1 and 1a except that, in addition, the apparatus includes another directional relay 69 for rotatably adjusting the loop 24 and is operated from the output of a runway localizer receptor 70 and its associated antenna 71. No gyroscopic drift compensator is provided in this embodiment, drift compensation being accomplished in another manner, as will appear later.

The equipment on the ground comprises only two radio transmitting stations designated as stations 1 and 2 which may be the same as stations 4 and 1—6 shown in Figs. 1 and 1a. From station 1 radiant energy is transmitted in all directions by the antenna 55 and a directive beam is projected vertically by the marker beacon 59. The stations 2, 3 and 5 shown in Figs. 1 and 1a are not necessary in the embodiment shown in Figs. 4 and 4a, and station 4 shown in Figs. 1 and 1a is designated as station 1 in Figs. 4 and 4a and includes the marker beacon projector 59, the non-directive transmitter 51 and antenna 55 of Figs. 1 and 1a. Then at station 2 there is provided a beacon transmitter 72 which projects a curved beam 73 having the same carrier frequency as the marker beacon projector 59 but modulated at a different audio frequency and comprising the glide path along which the aircraft is to be guided to a landing on the runway 44 of the landing field 20. The beacon transmitter 72 also transmits a directive beam having two components 74 and 75, one component being at one frequency and sending out one kind of a signal as for example the letter "A" (·—) and the other component being of a different frequency and sending out a different signal as for example the letter "N" (—·) as is well known in the art. The components 74 and 75 constitute a runway localizer beacon by which the aircraft is maintained in the proper direction to make its automatic landing on the runway 44.

At the runway localizer beacon transmitter at station 2 there is also provided a non-directive radio transmitter indicated by its antenna 46 as in the case of station 1, 6 of Figs. 1 and 1a, but no marker beacon is provided.

Reference is now made to Figs. 5 and 6 wherein are shown the runway localizer beacon transmittter 72, marker beacon transmitter 59 and the non-directive transmitter 46 (Fig. 6). Assuming that the aircraft is located as shown in Fig. 5 in approaching the airport 20, then from this point the aircraft will begin to fly under the automatic control of the invention. By means of the directional relay 22 and the radio compass 23, the direction of flight of the aircraft will be controlled so that it will fly to and over station 1 following the path 76 shown in Fig. 5. In so doing, the aircraft arrives within the sphere of influence of the marker beacon 59 at which time the radio compass is automatically tuned to the frequency of the non-directive transmitter 46 at station 2 so that the automatic pilot 21 will steer the craft in a line toward station 2. At the same time, the directions relay 69 comes into operation in combination with a runway localizer indicator (shown later in Figs. 16 and 16a) in response to radiant energy received from the localizer beam components 74 or 75 to provide for automatic compensation of the drift as will be explained more fully hereinafter. Likewise, a glide path indicator (also shown later in Figs. 16 and 16a) responsive to radiant energy from the glide beam 73 becomes operative to actuate the throttle through a relay and the automatic throttle control to bring the aircraft to a glide until the aircraft lands on the ground. When contact is made by either or both wheels of the aircraft touching the ground the throttle will be shut off automatically by the automatic throttle control.

The altitude control 33 is in operation just prior to reaching station #1 in order that the airplane will enter the glide path at a predetermined altitude and if the aircraft is above this predetermined altitude, the automatic throttle control will retard the throttle until a given rate of descent (approximately four hundred feet per minute) brings the airplane to this predetermined altitude which will be held until after passing station 1, the effects of the altitude control are modified by a rate-of-change-of-altitude device 34 which is effective to give vernier adjustments to the engine throttle to maintain the altitude primarily determined by the altitude control 33. At this point the altitude control is cut out of the circuit, the throttle is set in the "glide" position in response to a marker beacon signal at station 1, and the afore-mentioned glide path indicator is rendered operative to apply throttle adjustments to control the descent of the aircraft to maintain the same in substantial coincidence with the glide path 73 (Figs. 4 and 4a) radiated by the transmitter unit 72.

In the event that there is a side component of wind tending to cause the aircraft to drift to either side of the glide path 73 which is approximately in the center of the localizer beam, the signals from the runway localizer beam will cause the directional relay 69 to be operated to rotate the radio compass loop 24 through a loop rotating mechanism to correct for drift in a manner somewhat similar to that shown in our co-pending application Serial No. 214,560. This will keep the aircraft headed directly to station 2 and also keep it within the "on-course" signal of the runway localizer beam.

The aircraft, after passing station 1 at the predetermined altitude of one thousand feet, has its engine throttle set in the "glide" position by the throttle-control device 32 in response to a marker beacon signal at station 1, and immediately thereafter the aircraft intercepts the glide path 73 (Figs. 4 and 4a) of constant field intensity, so that if the aircraft is descending along the glide path, the glide path indicator will remain centered in its neutral position. If, however, the aircraft is above the glide path, the glide path indicator is operative to actuate a relay which in turn controls a veriner adjustment motor which is effective to cause the automatic throttle control 32 to close the throttle below the glide power output position an amount sufficient to cause the aircraft to descend until again on the glide path; while if the aircraft drops below the guide path, the glide path indicator is operative to actuate the said relay to cause a vernier throttle adjustment in the opposite sense to cause the aircraft to ascend until the glide path is again intercepted. The glide path indicator remains operative to control the descent of the aircraft through the control of the engine throttle until contact is made with the ground. Upon contact of the wheels with the ground, a landing gear switch becomes operative to cause the throttle control 32 to move the engine throttle to the "off" position. The aircraft will then roll to a stop.

One form of directional relay 22 and its connection to the automatic pilot 21 are shown in Figs. 8 and 9 and, as previously stated, is of the type described in our co-pending application Serial No. 95,042. As shown in Fig. 8, the relay comprises a reversible air turbine 77 driven in one direction or the other by a jet of air from a supply pipe 78, the direction of rotation of the air turbine 77 being controlled by means of a pivoted vane 79 connected to and actuated by the radio compass "left-right" indicator 80. The air turbine 77 has on the same shaft therewith a pinion 81 which meshes with a large gear 82, the latter being rotated by said pinion 81 in one direction or another against the tension of a pair of centering springs 83 and 84. On the gear 82 and rotatable therewith through a limited angle is a movable contact 85 which is adapted to engage one or the other of a pair of fixed contacts 86 and 87 to cause current to flow in one or the other of the two portions 88 and 89 of the field winding of a reversible series motor 90 which is provided with an adjustable rheostat 91 for adjusting the speed at which the motor should rotate. In other words, if movable contact 85 engages fixed contact 82, the motor 90 will rotate in one direction, and when movable contact 85 engages fixed contact 87 the motor 90 will rotate in the opposite direction a suitable power source (not shown) being connected to the terminals indicated as grounded.

A solenoid valve comprising a valve member 78a and a coil 80a is provided to periodically shut off the air supply from pipe 78 in order to give the pointer 80b of the indicator 80 a chance to move when the indicator is energized, as otherwise it might be held in one position by the force of the air jet on vane 79. The coil 80a is arranged for connection to a motor actuated circuit breaker 312 (Fig. 7) for periodic energization.

The motor 90 drives a worm 92 which meshes with a worm gear 93, the latter being connected, as seen in Fig. 9, through suitable gearing 94 and 95 to the air pick-off device 96 of the directional gyro 97 of the automatic pilot 21. The gyroscope 97 is effective through its associated mechanism 98, 99 and 100 to keep the aircraft on its course as determined by the radio compass.

Secured to the directional gyroscope 97 is a semicircular disc 101 having its straight edge immediately under the arms of the pick-off device 96. Normally, the arms of the pick-off intercept equal amounts of air from two exhaust ports which are immediately beneath the arms of the pick-off device. Upon rotation of the air pick-off 96 by the motor 90 through the gearing 92, 93, 94 and 95, the edge of the disc 41 which remains fixed relative to the gyroscope, causes unequal amounts of air to be intercepted by the two arms, resulting in a differential in pressure in said arms, which differential pressure is transmitted to the conventional air relay 98 to effect a flow of oil in the hydraulic system 102 of the servo unit 100 in order to cause a deflection of the rudder 36 in a direction to put the vehicle on the proper course. When the craft is back on the proper course, the rudder 36 must be returned to neutral position and the conventional follow-up system indicated generally at 103, 104 brings the pick-off device 96 back to the position shown.

From the foregoing description of the directional relay it will be seen that if the craft deviates to the left or right from its course as determined by the radio compass, the pointer of the radio compass indicator 80 will move to the left or to the right, thereby rocking the vane 79 in one direction or the other to direct the air jet from pipe 78 in such a manner as to drive the air turbine 77 clockwise or counter-clockwise, thus energizing either portion 88 or portion 89 of the field of the motor 90 and causing the latter to rotate in one direction or the other to adjust the air pick-off 96 of the directional gyro 97 in such a manner as to cause actuation of the servo unit 100 of the automatic pilot to move the rudder 36 in the proper direction to bring the aircraft back on the course determined by the radio compass.

In Fig. 10 there is shown one form of the frequency selector and selector switch 27 used in the present invention and comprises, as shown, a solenoid 105 connected to the output of the marker beacon receptor 28, whereby said solenoid becomes energized each time that a signal is received by the receptor from a marker beacon on the ground. Upon energization of the solenoid 105 it attracts one end of an armature 106 pivoted at one end as at 107 to cause actuation of a pawl 108 which advances a ratchet wheel 109 one notch. Attached to and rotatable with the ratchet wheel 109 is a switch arm 110 which is adapted to close any one of a plurality of circuits through a common contact 111 and respective contacts 112, 113, 114, 115, 116 and 117, the switch arm 110 being moved against the tension of a spring 118 attached thereto. The ratchet wheel 109 is held in its advanced position by means of a locking pawl 119 carried by a pivoted armature 120 associated in magnetic relation with a solenoid 121.

In the present instance, only three of the plurality of circuits are shown, namely, those connected to contacts 112, 113 and 117a, respectively. The contact 112 is connected by means of a lead 122 to a movable spring contact arm 123 which normally engages one or the other of a pair of relatively fixed contacts 124, 125 so as to energize either field winding 126 or 127 of the reversible series motor 128 when contacts 111 and 112 are closed by the switch arm 110. The motor 128 drives a shaft 129 through suitable reduction gearing (not shown) to rotate the tuning condenser 130 of the radio compass receiver 26 to a position corresponding to a predetermined frequency. On the shaft 129 and cooperating with spring contact arm 123 there is a cam 131 which controls the position of the contact arm 123 in such a manner that the cam 131 will cause the contact arm 123 to disengage either contact 124 or 125 and to thereby stop the motor 128 when the condenser 130 is in the proper position for the desired frequency of the receiver 26. Contact 113 of the selector switch is connected by means of a lead 132 to another spring contact arm 133 which is like spring contact arm 123 and which cooperates with a pair of relatively fixed contacts 134 and 135 to likewise energize the motor 128 and cause it to rotate in one direction or another and actuate the condenser 130 to tune the tuner 26 to another frequency. Cooperating with spring contact arm 133 is another cam 136 which is like cam 131 but is disposed in a different angular relation on shaft 129 so that the motor 128 will stop when the condenser 130 is in a position different from that when the motor 128 is stopped by the operation of the cam 131 and contact arm 123.

The contacts 114, 115, 116 and 117 may be connected respectively to other sets of contact arms like contact arms 123 and 133 in cooperation with additional cams like cams 131 and 136 to further control the motor 128 to rotate the condenser 130 to different positions corresponding to different frequencies, as will later appear from Figs. 7, 7a and Figs. 16 and 16a.

Contact 117a, however, is not connected to energize the motor 128 but is connected to the solenoid 121 so that when the contact arm 110 closes contacts 111 and 117a said solenoid becomes energized and attracts armature 120 against the tension of a spring 137, thereby disengaging pawl 119 from ratchet wheel 109 and causing the spring 118 to pull the switch arm 110 to its initial and normal position as shown in dotted lines at 110', i. e., out of contact with all of the contacts 111 to 117a, inclusive. Thus the solenoid 105 is the "advance" solenoid while the solenoid 121 is the "reset" solenoid.

The switch arm 110 of the selector switch may be made to simultaneously close any one of another set of contacts like contacts 111 to 117a, inclusive, and thereby control the setting of the throttle of the aircraft as will appear later in connection with Figs. 7, 7a and Figs. 16, 16a.

Referring now to Figs. 13, 14 and 15 there is shown one form of gyroscopic drift corrector used in the apparatus of the present invention and which is of the type disclosed in our previously-mentioned co-pending application Serial No. 214,560. Before proceeding with the description of the gyroscopic drift corrector, reference is first made to Figs. 11 and 12 which are diagrammatic representations of several types of flight of an aircraft toward and away from the landing field 20 at which is the radio transmitting station 1, 6 of Figs. 1 and 1a, for example.

In Fig. 11, the line of flight indicated by aircraft 19b represents the course resulting from the control of an automatic pilot under the condition of a cross wind coming from the left as indicated by an arrow, anad shows a constant drift away from the objective, namely, the transmitting station 1, 6. The automatic pilot will maintain any given heading of an aircraft, but repeated adjustment of heading is necessary to overcome the effect of side drift, and such adjustments are required of the navigator in these instances. A second line of flight is designated by the aircraft 19c, indicating the course of a craft equipped with an automatic pilot controlled by a radio compass but not provided with a drift compensator.

Due to the cross wind, the heading of the craft must be constantly changed by the radio compass in order to bring the craft to the landing field 20. While the heading is changed automatically by the radio compass, it is changed only after a deviation from the true course has occured, and consequently, the path of flight of the aircraft 19c is curved as shown and the degree of curvature is dependent upon the force of the cross wind.

The straight line flight illustrated by the aircraft 19 represents that of a craft equipped with the gyro drift compensator used in the present invention and shown in Figs. 13, 14 and 15. With this compensator the course is not the resultant of a series of corrections for error in course, but is a straight line due to instantaneous and automatic compensation for the cross wind which would otherwise produce an error in the course.

The flight paths of the respective aircraft equipped with the same control systems as described with respect to Fig. 11 are shown in Fig. 12 where the objective is away from the transmitting station 1, 6. The aircraft 19b is equipped with an automatic pilot only, and it will be observed that its course is exactly the same as shown in Fig. 11. It is characteristic of the automatic pilot to maintain constant heading rather than constant course, and since there is no radio control, the flight of the craft 19b will be the same whether the craft is approaching or leaving the transmitting station 1, 6.

The flight of aircraft 19c represents that of a craft having an automatic pilot controlled by a radio compass represented by the loop 24. The course is altered in response to indications of the radio compass. It may be seen that this flight is radically different from that of the corresponding craft in Fig. 11. The effect of the cross wind is to blow the craft off course until the point is reached where it is proceeding directly with the wind. The flight illustrated by aircraft 19 which has the gyroscopic drift corrector used in the present invention is a straight line on a direct course towards the objective, the direct course resulting from the initial compensation against the effect of the cross wind.

As shown in Fig. 13, a gyro controlled air relay 138 controls a reversible electric motor 139 connected through a worm shaft 140 and worm gear 141 to rotate the radio loop antenna 24 which is electrically connected to the radio compass 23 and the output of the latter being electrically connected to the left-right indicator 80. The relay mechanism is enclosed in a housing 142 which is rotatably supported within the aircraft represented by 143.

The air relay 138 is of the type employed in the conventional automatic or gyro pilots and is connected with a gyro control unit 144 by the air conduits 145 and 146 which lead to chambers 147 and 148 on opposite sides of a central diaphragm 149. An electrical contact 150 is mounted on the diaphragm where it may engage one or the other of a pair of adjacently positioned contacts 151 and 152. The contacts 150, 151 and 152 are connected by leads 153, 154 and 155, respectively, to the reversible motor 139.

When the plane of the loop antenna 24 is perpendicular to the line joining the loop and the transmitting station, the air pressures in chambers 147 and 148 are equal and diaphragm 149 is in neutral position as indicated by the dotted line 156. Upon deviation of the craft from the desired course, the automatic pilot will change the heading of the craft, whereupon the gyro control unit 144 will operate to cause unequal pressures in chambers 147 and 148 and diaphragm 149 will accordingly assume an off-neutral position such as shown. The direction of movement of the diaphragm 149 will depend upon whether the deviation of the craft from the desired course is left or right. As illustrated, contacts 150 and 151 are closed to effect the operation of motor 139 in such a manner as to rotate loop 24 in the proper direction.

A suitable gyro control unit is used in connection with the air relay 138, as shown diagrammatically in Fig. 14. The rotor of a rotatably mounted gyroscope 157 is driven in a manner well known in the art by an air blast from conduit 158, said air blast being created by a vacuum pump (not shown) which evacuates control unit housing 144a through a conduit 159. Attached to the support 160 of gyroscope 157 and rotatable therewith is a semi-circular disc 161 which normally covers equal portions of the inner ends of conduits 145 and 146 that lead to air relay 138. As soon as the heading of the craft is changed by the automatic pilot for the purpose of making a correction to compensate for drift, disc 161 moves relative to conduits 145 and 146, the gyroscope 157 and disc 161 remaining stationary while the drift corrector housing 144a and hence conduits 145 and 146 rotate in azimuth with the craft. By reason of this relative movement disc 161 closes one of the conduits 145 and 146 and opens the other, thereby causing a differential pressure in air relay 138, which is effective to actuate diaphragm 149 (Fig. 13) to close a circuit to the reversing motor 139. The motor rotates loop 24 and drift corrector unit 142 in the proper direction until conduits 145 and 146 assume their normal position relative to disc 161.

Fig. 15 clearly shows the manner in which the drift corrector 144 is used in connection with the automatic pilot 21 and radio compass 23 of the apparatus embodying the present invention.

Reference is now made to Figs. 7 and 7a which must be taken together in view of the fact that Fig. 7a is a continuation of Fig. 7, and the latter figure must be placed above Fig. 7a. These two figures comprise the wiring diagram of the complete apparatus of the embodiment of the invention shown in Figs. 1 and 1a, and also show diagrammatically the various elements comprising the complete apparatus, some of which have been previously described and others of which will be described hereinafter as the description proceeds with respect to Figs. 7 and 7a.

In Fig. 7a the radio compass loop 24 and compass antenna 25 are shown electrically connected to the input of the radio compass receiver 23 and the output of the latter is shown connected to the directional relay 22 in Fig. 7, said directional relay 22 embodying the left-right compass indicator 80 which controls the movable contact 85 so as to engage either contact 86 or 87 to energize the motor 90 for rotation in one direction or another to adjust the directional gyro of the automatic pilot 21 shown diagrammatically in Figs. 1 and 1a and in detail in Fig. 9.

The radio compass receiver frequency tuner 26 in Fig. 7a is shown as having its tuning element 130 mechanically connected through a worm drive 130a to the shaft 129 driven by the motor 128 of the frequency tuner 26 which is, in turn, controlled by the frequency and throttle selector switch 27 in response to radiant energy impulses received by the marker beacon receptor 28 (Fig. 7) from any one of the marker beacons shown at the stations 1, 6, 2, 3, 4 and 5 in Figs. 1 and 1a, or in response to other impulses produced by manual actuation of a switch as will appear later. For the purpose of operating the selector switch 27, the marker beacon receptor is shown as having its output connected by means of leads 162 and 163 to the "advance" solenoid 105 and to the elongated common contact 111 of the selector switch 27, whereby upon receipt of a radiant energy impulse by said marker beacon receptor 28 the "advance" solenoid 105 is energized to actuate the ratchet wheel 109 by means of pawl 108 to move the switch arm 110 to the contacts 112, 113, 114, 115, 116 or 117, each impulse from the marker beacon receptor advancing the switch arm 110 from one contact to the next. The contacts 112 to 117, inclusive, correspond to the respective transmitting stations on the ground and, therefore, are shown labeled as 1, 2, 3, 4, 5 and 6, respectively.

Contact 112 is connected to a lamp 164 through a resistor 165 and by means of lead 122 to spring contact 123 which is controlled by cam 131 of the frequency selector 26. Contact 113 is connected to lamp 166 through a resistor 167 and by means of lead 132 is also connected to spring contact arm 133 of the frequency selector 26. There are corresponding lamps 168, 169, 170 and 171, respectively, connected to contacts 114, 115, 116 and 117 through respectively associated resistors, and the contacts 114, 115, 116 and 117 are connected to spring contact arms 172, 173, 174 and 175 respectively of the frequency selector 26 by means of leads 176, 177, 178 and 179.

The spring contact arm 133 is controlled by cam 136, while spring contacts 172, 173, 174 and 175 are controlled by cams 180, 181, 182 and 183, respectively, all of the cams 131, 136, 180, 181, 182 and 183 being mounted on and rotatable with shaft 129 of motor 128, and the angular relation of each cam being such that it will stop the motor at different points during one revolution of the shaft 129, each point corresponding to the required position of tuning element 130 to tune the radio compass 23 to a predetermined frequency corresponding to the frequency of the particular transmitting station from which radiant energy is to be received.

An additional contact 184 designated as M is provided to cooperate with switch arm 110 of the selector switch 27 and when this contact 184 is engaged by the switch arm 110 the system is adapted for manual control and for this reason is connected by means of a lead 185 to a manually actuated switch 186 which is adapted to engage either one or the other of a pair of fixed contacts 187 and 188, these fixed contacts 187 and 188 being connected by means of leads 189 and 190 to spring contact arms 191 and 192, respectively of the frequency selector 26. The spring contact arms 191 and 192 are controlled by cams 193 and 194 carried on the shaft 129 of the motor 128 whereby upon actuation of the switch 186 into engagement with the contact 187 the motor 128 is rotated in one direction to decrease the frequency of the radio compass receiver 23, while actuation of the switch 186 into engagement with contact 188 energizes the motor 128 to rotate in an opposite direction to increase the frequency of the receiver 23.

Electrical energy is supplied to the entire system from a suitable source such as a battery (not shown) through a master switch 195 and leads 196 and 197. The lead 197 is the "ground" lead and is connected to ground at the various points in the system as indicated, while lead 196 is the "live" lead.

In the selector switch 27 there is provided a second set of contacts 198, 199, 200, 201, 202, 203 and 204 for controlling the automatic throttle control 32. These contacts cooperate with another section of wiper contact arm 110 and with a common contact 205, the two sections of the contact arm 110 being insulated from each other as shown at 206. These contacts are also labeled M, 1, 2, 3, 4, 5 and 6, respectively, to indicate that when the switch arm 110 is at M, the system is adapted for manual operation, and when at 1 or 2 or 3 or 4 or 5 or 6, the system is performing the required functions of tuning the radio compass to the respective frequency of each station and controlling the throttle to guide the aircraft toward each of the stations 1, 2, 3, 4, 5 and 6 at the proper altitude and at the proper speed until the craft makes contact with the ground as it approaches station 6. When wiper contact arm 110 is actuated by means of pawl 108 and ratchet wheel 109 upon each energization of the advance solenoid 105, said switch arm 110 closes contacts 184—111 and 198—205, or 112—111 and 199—205, or 113—111 and 200—205, or 114—111 and 201—205, or 115—111 and 202—205, or 116—111 and 203—205, or 117—111 and 204—205. Contact 199 is connected by means of a lead 206 to a spring contact arm 207 of a throttle position selecting device of the automatic throttle control 32, the throttle position selecting device being substantially like the frequency selecting device 26. The spring contact arm 207 is normally in engagement with one or the other of a pair of relatively stationary contacts 208 and 209 which are respectively connected to oppositely wound field windings 210 and 211 of a reversible series motor 212 which rotates a shaft 213 through suitable reduction gearing such as a worm and worm gear (not shown) and through a magnetic clutch 214, the shaft 213 being connected to actuate a fuel supply valve 215 of either the aircraft engine 29 or the aircraft engine 30 depending upon which of these engines is the master engine, the other engine being kept in synchronism therewith by means of the engine synchronizer 31 (Fig. 1). When the magnetic clutch 214 is disengaged, the valve 215 may be actuated manually by means of an arm 216 connected in the usual manner to the ordinary manual throttle control (not shown).

Normally, spring contact arm 207 is in engagement with one or the other of the relatively stationary contacts 208 and 209 to cause rotation of the motor 212 and shaft 213 in one direction or the other, by a cam 217 carried on and rotatable with the shaft 213 is arranged to disengage the contact 207 from either contact 208 or 209 when the cam is in a certain position during one revolution of the shaft 213, whereupon the motor 212 is stopped and the shaft 213 is then in such a position that the valve 215 is opened a predetermined amount to feed fuel to the associated engine at a rate to provide a desired speed of the aircraft. In the present instance, this position is such as to provide sufficient speed to the craft for it to take off from the ground and will be referred to as as the "take-off" speed.

On the shaft 213 which controls the throttle valve 215 are provided additional cams 218, 219, 220 and 221 which respectively actuate spring contact arms 222, 223, 224 and 225 to bring them out of engagement with their respective pairs of relatively fixed contacts 226—227, 228—229, 230—231, 232—233. In the present case, spring contact arm 224 is a "dead" contact and provides no control of the throttle valve 215. The other spring contact arms 222, 223 and 225 and their cooperating cams 218, 219 and 221, like contact arm 207 and its cooperating cam 217 control the motor 212 and shaft 213 to provide other predetermined settings of the throttle valve 215.

Cam 218, for example, is so arranged on shaft 213 as to disengage contact arm 222 from either one of its associated relatively fixed contacts 226 and 227 at a time when the throttle valve 215 is in a position to provide fuel to the aircraft engine at a rate sufficient to bring about a "cruising" speed of the aircraft, while cam 219 is so mounted on the shaft 213 as to stop the motor 212 when the throttle valve 215 is in a position to provide fuel to the aircraft engine at such a rate that the aircraft will fly at a "gliding" speed. Finally, the cam 221 is so mounted on shaft 213 that it will actuate its associated contact arm 225 to stop the motor 212 when the throttle valve 215 is in the "off" position. Thus, the automatic throttle control 32 automatically provides for setting of the throttle valve 215 to obtain a "take-off" speed, a "cruising" speed and a "gliding" speed of the aircraft, and also to close the throttle valve to the "off" position.

In order to obtain a cruising speed of the aircraft at a desired time by the operation of the cam 218 and its associated contact arm 222, the latter is connected by means of a lead 234 to a relatively fixed contact 235 of a relay 236 having an actuating coil 237 for actuating a movable contact 238 out of engagement with the stationary contact 235 at a predetermined time. Normally, the movable contact 238 is in engagement with the stationary contact 235 until such time as the relay coil 237 is energized in a manner and by means which will be described later. Thus, the circuit from the contact arm 222 of the throttle control is completed by means of lead 234 through contact 235 and contact 238 and then through lead 239 to contacts 200, 201 and 202 of the selector switch 27, said contacts 200, 201 and 202 being connected together for the reason that a "cruising" speed of the aircraft is required when the switch arm 110 is in each of the three positions in which it engages contacts 200, 201 and 202, respectively. The circuit is then continued from either contact 200 or 201 or 202 through switch arm 110 to the common contact 205, depending upon which of said contacts is engaged by switch arm 110, then from common contact 205 through lead 163 and lead 196 to one side of the master switch 195. Thus it will be seen that the throttle valve 215 will be in "cruise" position when switch arm 110 is in engagement with either contact 200 or 201 or 202 of the selector switch 27.

It is desired that the cruising speed be maintained at a predetermined altitude and, for the purpose of automatic landing in accordance with the present embodiment, at two different altitudes, as, for example, first at an altitude of one thousand feet and then at an altitude of two hundred feet as the aircraft is coming in for a landing. For the purpose of maintaining the cruising speed at an altitude of one thousand feet the relay coil 237 of relay 236 is connected by means of lead 240 to a movable contact 241 which is adapted to be actuated into engagement with a relatively fixed contact 242 by means of an expansible aneroid diaphragm 243 of an altimeter 243a responsive to changes in altitude of the aircraft. In the present instance the aneroid diaphragm 243 comprises one part of the altitude responsive control 33 shown in Figs. 1 and 1a, and the movable contact 241 is so arranged as to be actuated into engagement with the fixed contact 242 by the diaphragm 243 when the altitude is above one thousand feet, for example.

The closing of the contacts 241 and 242 energizes the coil 237 of the relay 236 to actuate the movable contact 238 of said relay out of engagement with the fixed relay contact 235 and into engagement with another relatively fixed contact 244 of said relay 236. The relatively fixed contact 244 of the relay 236 is connected by means of a lead 245 to spring contact arm 223 of the selector switch of the throttle control 32, thereby changing the setting of the throttle valve 215 to a gliding speed position. Thus, by means of the aneroid diaphragm 243 and relay 236 the aircraft is maintained at a cruising speed at an altitude of one thousand feet, and in the event that the craft should rise above an altitude of one thousand feet the relay 236 will be controlled by the aneroid diaphragm 243 to change the setting of the throttle valve 215 from a cruising speed to a gliding speed until the craft is back to the one thousand foot altitude, at which time the aneroid diaphragm 243 will control the relay 236 to change the position of the throttle valve 215 back to a cruising speed position.

It is desired that the altitude of the aircraft be reduced to a lower altitude, as for example two hundred feet, as the aircraft is coming in for a landing, and for this reason another altimeter 246a having an aneroid diaphragm 246 is provided for actuating a movable contact 247 into engagement with a relatively fixed contact 248, these latter contacts together with the aneroid diaphragm 246 comprising another part of the altitude responsive control 33 shown in Figs. 1 and 1a. The movable contact 247 is connected by means of a lead 249 to a coil 250 of another relay 251 which is provided with a pair of relatively fixed contacts 252 and 253 and a movable contact 254 which is adapted to engage either one or the other of the relatively fixed contacts 252 and 253.

Normally, the movable contact 254 of relay 251 is in engagement with the fixed contact 253 but is adapted to be actuated out of engagement therewith and into engagement with the fixed contact 252 upon energization of the coil 250 when the aneroid 246 moves the contact 247 into engagement with the contact 248. The relatively fixed contacts 252 and 253 of relay 251 are in parallel with the fixed contacts 244 and 235 of relay 236, thereby providing the same shift of the position of the throttle valve 215 from the cruising speed position to a gliding speed position in the event that the altitude of the aircraft increases beyond two hundred feet as determined by the aneroid 246.

In order that the control from the aneroid 246 and relay 251 be introduced at the proper time, i. e., just prior to landing of the aircraft, the movable contact 254 of relay 251 is connected by means of a lead 255 to contact 203 of the selector switch 27. Thus the two hundred foot altitude control is not obtained until such time as the switch arm 110 of the selector switch 27 is advanced by means of the advance solenoid 105 and pawl and ratchet 108—109 to connect contact 203 with common contact 205, the reason for which will appear hereinafter.

In order to provide a more sensitive control of the cruising speed and gliding speed of the aircraft through the automatic throttle control 32, the rate-of-change-of-altitude responsive control 34 of Figs. 1 and 1a is provided and, as shown in Fig. 7, comprises a rate of climb indicator 256 arranged to control the gliding speed of the aircraft in a manner to bring about a rate of descent, in the present instance, of not more than four hundred feet per minute as the craft is about to land. Another rate of climb indicator 257 is provided and is so arranged that no control is obtained therefrom while the craft is in level flight either at the one thousand foot altitude or the two hundred foot altitude, but provides a control in the event that the craft tends to go above or below either the one thousand foot altitude or two hundred foot altitude.

The rate of climb indicator 256 is provided with a disc 258 having an opening 259 therein and which is adapted to be rotated by the rate of climb responsive diaphragm (not shown). On one side of the disc 258 is a lamp 260 and on the opposite side of said disc 258 is a photronic cell 261. Thus when the disc 258 is actuated into a position in which the aperture 259 thereof is between the lamp 260 and the photronic cell 261, light passes from the lamp to the cell to cause a current to flow in one direction through the leads 262 and 263 which connect the cell 261 to a coil 264 of a sensitive relay 265 having a movable contact 266 adapted to be actuated by the coil 264 into or out of engagement with either one of a pair of relatively fixed contacts 267 and 268.

The rate of climb indicator 257 likewise comprises a disc 269 having an aperture 270 which is arranged to be actuated by means of a rate of climb responsive diaphragm (not shown). On one side of the disc 269 is a lamp 271 and on the other side thereof is a photronic cell 272 so that when disc 269 is actuated into a position in which the aperture 270 is between the lamp 271 and photronic cell 272, light passes from said lamp to said cell and causes a current to flow in the leads 273 and 274 which connect the cell 272 to a coil 275 of a sensitive relay 276 having movable contact 277 adapted to be actuated by the coil 275 into or out of engagement with either one or the other of a pair of relatively fixed contacts 278 and 279.

Fixed contacts 267 and 268 of sensitive relay 265 are respectively connected to coils 280 and 281 of a power relay 282, while fixed contacts 278 and 279 of sensitive relay 276 are respectively connected to coils 283 and 284 of a power relay 285. The power relay 282 is provided with a pair of movable contacts 286 and 287 adapted to be respectively actuated into engagement with cooperating fixed contacts 288 and 289 upon energization of the coils 280 and 281 of said relay 282, i. e., when coil 280 is energized it actuates movable contact 286 into engagement with fixed contact 288, and when coil 281 is energized it actuates movable contact 287 into engagement with fixed contact 289.

Power relay 285 is likewise provided with movable contacts 290 and 291 which are adapted to be actuated into respective engagement with fixed contacts 292 and 293 upon energization of coils 283 and 284 of said power relay 285, i. e., when coil 283 is energized it actuates movable contact 290 into engagement with fixed contact 292, and when coil 284 is energized it actuates movable contact 291 into engagement with fixed contact 293.

Movable contact 286 of power relay 282 is connected in parallel with movable contact 290 of relay 285 by means of the lead 294, and movable contact 287 of relay 282 is connected in parallel with movable contact 291 of relay 285 by means of the lead 295. The movable contacts 287 and 291 are connected by means of the lead 295 to one field winding 296 of a motor 297, while the movable contacts 286 and 290 are connected by means of the lead 294 to another field winding 298 of said motor 297 which is a series motor and associated with the throttle-control device 32. The field windings 296 and 298 of motor 297 are wound in opposite directions so that when one winding is energized the motor rotates in one direction, and when the other winding is energized the motor rotates in an opposite direction.

The motor 297 is a vernier adjusting motor and is connected in any suitable manner, as indicated by the dotted line 299, to an adjustable carrier 300 which carries the contacts 226—227 and 228—229 of the selector switch of the automatic throttle control 32, whereby, upon rotation of the motor 297 in one direction or another, the contacts 226—227 and the contacts 228—229 are moved in one direction or another with respect to their cooperative spring contact arms 222 and 223. By means of this vernier adjustment of the relatively fixed contacts 226—227 and 228—229 by the motor 297, small corrections can be made to the throttle after the main throttle motor 212 and the cams 218 and 219 on the shaft 213 of said motor 212 have placed the throttle in the approximate position for a cruising speed or a gliding speed, depending upon which setting is called for by the selector switch 27.

In order to prevent the rate of climb responsive devices 256 and 257 from exerting a control on the automatic throttle control device 32 while the throttle is being changed from a glide position to a cruise position, or vice versa, by the main throttle motor 212, a relay 301 is provided which comprises a pair of normally closed switches 302 and 303 which are actuated into open position by coils 304 and 305 upon energization of said coils. The coil 304 of the relay 301 is arranged to be energized upon energization of the field winding 210 of the main throttle adjusting motor 212 and for this reason said coil 304 and field winding 210 are connected together by means of a lead 306. The coil 305 of the relay 301, on the other hand, is arranged to be energized upon energization of the other field winding 211 of the main throttle motor 212 and, therefore, said coil 305 is connected to said field winding 211 by means of a lead 307. It will be noted that switches 302 and 303 of the relay 301 are in series with the windings 280, 281 of relay 282 and windings 283, 284 of relay 285, respectively, and, therefore, said relays 282 and 285 are effective to control the vernier adjusting motor 297 only when said switches 302 and 303 are closed, and this condition exists only after the main throttle motor 212 has been stopped and its field windings 210 and 211 are de-energized. When the motor 212 is running by virtue of the energization of either its field winding 210 or its field winding 211 then the coils 304 or coil 305 of relay 301 is energized, whereby the switch 302 and the switch 303 are opened and the relays 282 and 285 rendered ineffective to energize the field windings 296 and 298 of vernier adjusting motor 297.

The sensitive relays 265 and 276 are provided with additional coils 308 and 309, respectively, which are connected in parallel with each other by means of a lead 310 and in series with a switch 311 of a motor actuated circuit breaker 312, the motor of which is shown at 313 with its series field winding 314. The switch 311 of the motor actuated circuit breaker 312 is arranged to be closed during each revolution of the motor 313 to thereby periodically energize the coils 308 and 309 of the sensitive relays 265 and 276. The purpose of this periodic energization of the coils 308 and 309 is to cause said coils to periodically actuate the associated movable contacts 266 and 277 to their central positions and thereby overcome the tendency of said movable contacts 266 and 277 to remain in engagement with either one or the other of their associated fixed contacts 267, 268 and 278, 279 respectively.

The motor-actuated circuit breaker 312 is also arranged to energize the coil 80a of the directional relay 22 and for this purpose the coil 80a is connected by means of a lead 315 to the switch 311.

A dynamotor 316 is provided for supplying the necessary power to the marker beacon receptor 28 and is connected to the latter by means of leads 317 and 318.

Current is supplied to the lamp 260 of the rate of climb responsive device 256 by means of a lead 319 which, in turn, is connected to the lead 245 at the junction 320, the lead 245 being connected to the spring contact arm 223 of the automatic throttle control 32, said contact arm 223 being the one through which the throttle motor 212 actuates the throttle valve 215 to the "glide" position and, therefore, the rate of climb responsive device 256 cannot effect a control of the throttle unless the latter is in the "glide" position, and it can be in this "glide" position only when the switch arm 110 is in engagement with the contact 204 (position 6) of the selector switch 27 by reason of the fact that said contact 204 is connected to the lead 245 by means of a lead 320a.

Current is supplied to the lamp 271 of the rate of climb responsive device 257 by means of a lead 271a which is connected to the lead 234 at the junction 271b, the lead 234 being connected to the spring contact arm 222 and the lead 271a extending from junction 271b through the contacts 235 and 236 of the one thousand foot altimeter relay 236 and through lead 239 to the contacts 200, 201 and 202 of selector switch 27. Spring contact arm 222 is the one through which the throttle motor 212 actuates the throttle valve 215 to the "cruise" position and, therefore, the rate of climb responsive device cannot effect a control of the throttle unless the latter is in the "cruise" position, and it can be in this "cruise" position only when the switch arm 110 is in engagement with contact 200 or 201 or 202 of the selector switch 27a, i. e., when switch arm 110 is in positions 2, 3 or 4.

In addition to energization of the advance solenoid 105 of the selector switch 27 through the lead 163 by means of impulses received by the marker beacon receptor 28 to advance the switch arm 110, manually actuated means are provided for causing energization of said solenoid 105 when desired and, as shown, said means comprise a hand-operated switch 321 located at the selector switch 27, one side of said switch 321 being connected to the lead 163 and the other side to the common contact 205 which is in turn connected to the lead 162, which in turn connects to power lead 196. Each time that the advance solenoid coil 105 is energized either by virtue of an impulse received by the marker beacon receptor 28 or by actuation of the hand-operated switch 321 a lamp 322 is energized which is in parallel with said solenoid 105. Each time the lamp 322 is energized automatically from marker beacon receptor 28, it indicates to the pilot that he just passed over a marker beacon.

A switch 323 is arranged to be controlled by the position of the switch arm 110 of the selector switch 27 and for this purpose said switch arm 110 is provided with an extension 324 at its other end for maintaining said switch 323 in open position when the switch arm 110 is in engagement with contacts 104—198 or contacts 112—199, but upon an advance of the switch arm 110 to all other consecutive positions thereof, the switch 323 is adapted to be closed by virtue of its own resiliency by reason of the fact that the movable arm thereof is of spring material. One side of said switch 323 is connected to one end of the reset solenoid 121 by means of the lead 325 and the other side of said switch is connected to the common contact 205 which is, in turn, connected to the lead 162. The other end of the reset solenoid coil 121 is connected by means of a lead 326 to one side of a manually-actuated switch 327 and also to one side of a pair of landing gear actuated switches 328 and 329, one of which is adapted to be closed by the landing gear of the aircraft when one of the wheels of the landing gear strikes the ground, and the other of said switches being adapted to be closed by the landing gear of the aircraft when the other wheel of the landing gear strikes the ground, or if both wheels of the landing gear strike the ground at the same time then both of said switches 328 and 329 will be actuated to closed position. The other side of the manually-actuated resetting switch 327 is connected to ground, as shown, and the other side of landing gear actuated switches 328 and 329 is connected to the lead 197 which is the "ground" lead of the master switch 195. A normally closed test switch 330 is provided which is in series with the landing gear actuated switches 328 and 329.

The magnetic clutch 214 is arranged to connect the throttle motor 212 to the shaft 213 only when said motor 212 is energized for rotation and for this purpose there is provided a clutch meshing solenoid represented by a pair of solenoid coils 331 and 332 connected respectively to field coils 210 and 211 of said motor 212 so that said solenoid coils 331 and 332 are energized only when said field coils 210 and 211 are energized, respectively. The clutch meshing solenoid is connected to the clutch 214 as shown diagrammatically by means of the dotted line 333.

Manually actuated means located in a convenient place in the cockpit for easy reach by the pilot are also provided for operating the rudder of the aircraft through the directional relay 22 and the automatic pilot 21 and for controlling the throttle through the automatic throttle control 32, such manually actuated control means being also adapted for use for test purposes. As shown in Figs. 7 and 7a, the manually actuated means comprise a box 334 within which are located three hand-operated switches 335, 336 and 337, respectively. The switch 335 is for the purpose of actuating the rudder of the aircraft through the directional relay 22 and automatic pilot 21 and comprises a movable contact 338 connected by means of a lead 339 to a fixed contact 340 of the switch 335. The movable contact 338 is adapted to be engaged with either one or the other of a pair of fixed contacts 341 and 342, said contacts 341 and 342 being connected to the field windings 88, 89 respectively of the gyro-actuating motor 90 by means of leads 343 and 344, respectively, and are also connected in parallel relation with contacts 86 and 87 of the directional relay 22 by means of the leads 343a and 344a. Thus, the gyro-actuating motor 90 may be energized by either the manually actuated switch 335 or by the automatically actuated relay switch 86, 87, 88 of the directional relay 22 by the compass indicator 89, whereby said motor 90 may be caused to rotate in one direction or the other to adjust the directional gyro of the automatic pilot 21 to steer the craft to the left or to the right.

The manually actuated switch 336 is a single pole double throw switch comprising a movable contact 345 which is adapted to engage either the fixed contact 340 or another fixed contact 346. As previously stated, fixed contact 340 of the switch 336 is connected by means of the lead 339 to the movable contact 338 of the switch 335. Fixed contact 346 of the switch 336 is connected by means of a lead 347 to the movable contact 85 of the directional relay 22. Thus, when the movable contact 345 is in engagement with fixed contact 340 the electric motor 90 is connected for energization by actuation of the manual switch 335, and when the fixed contact 345 of the switch 336 is in engagement with the fixed contact 346 then the motor 90 is connected for automatic operation by the directional relay 22.

The manually actuated switch 337 is a throttle control switch for actuating the throttle valve 215 of the aircraft engine through the automatic throttle control device 32 and comprises, as shown, a movable switch arm 348 which is adapted to engage any one of four fixed contacts 349, 350, 351 and 352. The movable switch arm 348 is connected by means of a lead 353 to contact 198 (position M) of the selector switch 27a, while fixed contact 349 of the switch 337 is connected by means of a lead 354 to spring contact arm 225 of the throttle control device 32, said spring contact 225 being the one which energizes the throttle motor 212 to actuate the throttle valve 215 to the "off" position. Accordingly, the fixed contact 349 of the switch 337 is designated as the "off" contact.

Fixed contact 350 of the switch 337 is connected by means of a lead 355 to lead 206 at the junction 356, the lead 206 being connected, as previously indicated, to the spring contact 207 of the automatic throttle control device 32 and to contact 199 (position 1) of the selector switch 27. Thus, when movable switch arm 348 of the switch 337 is moved to engage the fixed contact 350 thereof, then throttle motor 212 is energized to actuate the throttle to the "take-off" position. Accordingly, the contact 350 is designated as the "take-off" contact.

Fixed contact 351 is connected by means of a lead 357 to lead 245 at the junction 320 while said lead 245 is also connected by means of lead 319 to the lamp 260 of the rate of climb responsive device 256. It will be noted that lead 245 is the one which is connected to spring contact 223 of the automatic throttle control device 32 and is also connected to lead 320a which is connected to contact 204 of the selector switch 27. The lead 245 is also connected to fixed contact 244 (which is the "glide" contact) of the one thousand foot altimeter relay 236. Therefore, when movable switch arm 348 of the switch 337 is in engagement with fixed contact 351, the throttle motor 212 is energized to actuate the throttle valve 215 to the "glide" position.

Fixed contact 352 of the manually actuated switch 337 is connected by means of a lead 358 to lead 353 at the junction 271b where the lead 271a is likewise connected to said lead 234. It will be noted that the lead 234 goes to the spring contact 222 of the automatic throttle control device 32 so that when the switch arm 348 of the switch 347 is in engagement with the fixed contact 352, the throttle motor 212 is energized to actuate the throttle valve 215 to the "cruise" position.

Manually operated means are also provided for manual control of the actuation of the selector switch 27, together with means for indicating the position to which the switch arm 110 of said selector switch 27 has been actuated either manually or in response to an impulse received by the marker beacon receptor 28. Manually operated means are likewise provided for controlling the frequency selector 26. All of these three means are contained within a box 359 conveniently located adjacent the box 334 in the pilot's cockpit for ready access to the pilot.

As illustrated, the manually operated means for controlling the actuation of the switch arm 110 of the selector switch 27 comprise two manually actuated switches 360 and 361, respectively, which are normally open. The switch 361 has one side connected to the power supply lead 196 and has its other side connected by means of a lead 362 to the lead 163 at the junction 363, the lead 163 being connected to the "advance" solenoid 105. Thus, each time that the switch 361 is closed, the advance solenoid 105 becomes energized and advances the switch arm 110 successively from position M to positions 1, 2, 3, 4, 5 and 6.

The manually actuated switch 360 is grounded on one side, as shown, and on its other side is connected by means of a lead 364 to the lead 326 at the junction 365, the lead 326 being the one which is connected to the "reset" solenoid 121. Therefore, when the switch 360 is closed, the reset solenoid 121 becomes energized to disengage pawl 119 from ratchet wheel 109, thereby causing the spring 118 to actuate the switch arm 110 back to its initial position (position M).

Accordingly, the switch 360 is designated as the "reset" switch and the switch 361 is designated as the "advance" switch.

The third manually actuated switch contined within the box 359 is for manually controlling the electric motor 128 of the frequency selector 26 to increase or decrease the frequency of the radio compass receiver 23 by actuating the tuning element 130 thereof. In the form shown, said third switch comprises a movable switch arm 366 which is adapted to be moved into engagement with one or the other of a pair of fixed contacts 367 and 368. The switch arm 366 is connected by means of a lead 369 to a lamp 370 and is also connected to lead 185 which leads to contact 184 (position M) of the selector switch 27, said contact 184 being also connected to a lamp 184a which is similar to the lamp 370. The lamps 184a and 370 are always energized when the switch arm 110 of the selector switch 27 is in engagement with contact 184 (position M) and both are designated by the letter "M" to indicate that the system is in condition for manual operation. The fixed contact 367 is connected by means of a lead 371 to the 189 at the junction 372, while the fixed contact 378 is connected by means of a lead 373 to a lead 190 at the junction 374. From this it will be seen that when the movable switch arm 366 is in engagement with the contact 367 the motor 127 will be energized through spring contact 192 to rotate the tuning element 130 of the compass receiver 23 to increase the frequency, and when said switch arm 366 is in engagement with the fixed contact 368 the motor 128 will be energized through lead 190 and spring contact 191 to rotate the tuning element 130 of the compass receiver 23 to decrease the frequency thereof.

Additional lamps 375, 376, 377, 378, 379, 380 and 381 are provided within the box 359 and they correspond to lamps 164, 166, 168, 169, 170, 171 and 322 located at the selector switch. Although all of the lamps both at the box 359 and at the selector switch 27 are enclosed, they are made visible by small openings (not shown) in the enclosures. The lamp 381 is connected in parallel with the advance switch 361 to the lead 362 and hence to the lead 163 which is connected to the advance solenoid 105 and therefore said lamp 381 will light up like lamp 322 each time that the advance solenoid 105 is energized either by an impulse received by the marker beacon receptor 28 or by manual actuation of the advance switch 361 at the box 359 or the advance switch 321 at the selector switch 27. Both lamps 381 and 322 have the designation "MB" to indicate that the aircraft has passed over a marker beacon each time they light up when the system is functioning automatically. When they light up by manual actuation of the switch 361 or 321 they indicate that the circuits with which they are associated are in operative condition.

Lamps 375, 376, 377, 378, 379 and 380 like lamps 164, 166, 168, 169, 170 and 171 are connected respectively to contacts 112, 113, 114, 115, 116 and 117 by means of leads 122, 132, 176, 177, 178 and 179. Each of these lamps of each set has the designation 1, 2, 3, 4, 5 and 6 respectively, to indicate that when a particular lamp is lit the radio compass receiver 23 is tuned to the particular transmitting station represented by the designation on the lamp and that the aircraft is being guided toward that particular station automatically by the automatic pilot 21 through the directional relay 22 under the control of the radio compass 23.

With reference to the wiring diagram of the complete system shown in Figs. 7 and 7a, the operation is as follows:

As previously indicated, the switch arm 110 of the selector switch 27 is normally in the M position, i. e., in engagement with contacts 184 and 198, at which time the system is in condition for manual control through the various means previously described. When it is desired to make the aircraft take off automatically from the landing field 20 (Fig. 1 and 1a) along the runway 44 in the direction of station 1 where the non-directional transmitter 45 and the marker beacon 48 are located, the master switch 195 is first closed to supply power to the entire system. Then, either the advance switch 361 at the box 359 may be momentarily closed by the pilot or the advance switch 321 located at the selector switch 27, which is usually in the control room of a larger aircraft, may be momentarily closed by the flight engineer. The momentary closing of either advance switch 361 or advance switch 221 energizes the advance solenoid 105 to actuate the switch arm 110 to position 1, i. e., in engagement with contacts 112 and 199 of the selector switch 27. As soon as switch arm 110 is in position 1 the frequency selector 26 immediately tunes the radio compass receiver 23 to the frequency of the non-directive transmitter at station 1, and the automatic throttle control 32 actuates the throttle valve 215 to "take-off" position, whereupon the aircraft engine or engines develop sufficient power for the aircraft to take off from the ground and fly toward station 1 under the control of the automatic pilot 21, directional relay 22 and radio compass 23.

As the aircraft passes over station 1, the marker beacon receptor 28 receives radiant energy from marker beacon 48 and produces an impulse which energizes advance relay 105 of the selector switch 27, thereby causing the switch arm 110 to advance to position #2, i. e., into engagement with contacts 113 and 200, whereupon the radio compass 23 is immediately and automatically tuned to the frequency of the non-directive transmitter located at station #2, and at the same time the automatic throttle control device 32 adjusts the throttle to "cruise" position, provided the altitude of the aircraft is not above one thousand feet, the automatic throttle control device 32 being, in turn, controlled by the one thousand foot altimeter control including the aneroid 243 and its associated relay 236. In the event that the altitude of the aircraft is higher than one thousand feet then the altitude control, through its relay 236 will actuate the throttle into a glide position to reduce the speed of the aircraft until the latter losses sufficient altitude to bring it to the one thousand foot level, at which time the throttle is again advanced to the cruising position. Through the action of the radio compass, which is tuned to station #2, and the automatic pilot under the control thereof, the aircraft will automatically turn and will be automatically guided toward station #2 at a constant altitude of one thousand feet.

When the aircraft approaches station #2 it will be placed in operative condition for an automatic landing, but if it is not desired to land at this time, the pilot may merely actuate the reset switch 360 at the control box 359, or the flight engineer may actuate the reset switch 327 at the selector switch 27, to return the switch arm 110 of the selector switch to its M or manual position, at which time the pilot may then control the throttle valve 215 directly by manual operation or he may move the switch arm 348 at the control box 334 to the cruise position, thereby moving the throttle valve 215 to the cruise position through the automatic throttle control 32.

While the aircraft is flying toward station #1 lamps designated #1, i. e., lamp 375 at the control box 359 and lamp 164 at the selector 27 are illuminated until the aircraft passes over station #1, at which time the lamps designated MB, i. e., lamp 381 at the control box 359 and lamp 322 at the selector switch are momentarily lit up by the action of the beam 49 of the marker beacon 48. Then as the switch arm 110 of the selector switch 27 is actuated to position #2 by the action of the beam 49 of the marker beacon 48 on the marker beacon receptor 28, the lamps designated as #2 are lit up and remain so.

When it is desired to make an automatic landing, the master switch 195 is closed, as before, and the selector switch 27 is advanced to position #2, by actuation of the advance switch 361 or the advance switch 321, thereby automatically tuning the radio compass 23 to the frequency of the non-directive radio transmitter at station #2, and setting the throttle to the cruise position under the control of the one thousand foot altitude control including the aneroid 243 and its associated relay 236.

In passing station #2, radiant energy from the marker beacon 61 is received by the marker beacon receptor 28 and the advance solenoid 105 actuates the switch arm 110 to position #3. This tunes the radio compass 23 to station #3, and since positions 2, 3 and 4 on the selector switch 27 are wired together for the throttle control, this leaves the throttle in the cruise position as when the selector switch was in position #2. Thus, the aircraft will continue at a cruising speed toward station #3 at a controlled altitude of one thousand feet.

In passing station #3 the selector switch 27 is advanced to position #4, thus tuning the radio compass 23 to station #4 and leaving the throttle in the cruise position as before. The craft continues to fly toward station #4 at a cruising speed and at a controlled altitude of one thousand feet.

As the aircraft passes station #4, the selector switch 27 is advanced to position #5 by the action of the radiant energy received from the marker beacon 59 at station #4, and in position #5 the frequency selector 26 tunes the radio compass 23 to the frequency of the non-directive transmitter at station #5 so that the aircraft is guided toward this station by the automatic pilot 21 under the control of the radio compass. At the same time, i. e., when switch arm 110 of the selector switch 27a is in position #5 and in engagement with contacts 116 and 203, the automatic throttle control device 32 sets the throttle to a glide position and the control of the rate of climb responsive device 256 is brought into operation so that the rate of descent of the aircraft is maintained at substantially four hundred feet per minute until the aircraft descends to an altitude of two hundred feet, at which time the one thousand foot altimeter control is rendered ineffective and the two hundred foot altimeter control brought into operation by reason of the fact that switch arm 110 of the selector switch 27 is in engagement with contact 203. In the event that the minimum altitude of two hundred feet is reached before the aircraft arrives at station #5, the throttle is changed to the cruise position by the two hundred foot altitude control including aneroid diaphragm 246 and relay 251 and is held at this altitude until station #5 is reached.

As the aircraft passes over station #5, the selector switch 27 is advanced to position #6, i. e., into engagement with contacts 117 and 204, by energization of advance solenoid 105 by an impulse received from the marker beacon receptor 28 by the action of the radiant energy received from marker beacon 58 at said station #5. Thus, the radio compass 23 is tuned to the frequency of the non-directive transmitter at station #6 (which is also station #1), and the automatic throttle control device 32 actuates the throttle valve 215 into glide position with both altitude controls completely out of the circuit. The rate of descent is again controlled by the glide rate of climb control device 256 to obtain a rate of descent of approximately four hundred feet per minute. Thus, the aircraft continues to lose altitude at a gliding speed until its landing gear makes contact with the ground along the runway 44 at the field 20 (Figs. 1 and 1a). Upon making contact with the ground, either one or the other or both of the landing gear switches 328 and 329 are closed, thereby energizing the "reset" solenoid 121 of the selector switch 27, which actuates pawl 119 to release ratchet wheel 109 and return switch arm 110 to its M position by the action of the spring 118. At the M or manual position of the selector switch 27, the radio compass 23 remains tuned to station #6 and the throttle is in the "off" position so that the aircraft is held on a straight course by means of the automatic pilot 21, radio compass 23 and directional relay 22 until the craft stops rolling.

Throughout the above-described operation, as the selector switch 27 is going through its sequence of operation, the lamps at the selector switch and at the control box are illuminated in sequence from the M position through positions 1, 2, 3, 4, 5 and 6, thereby showing the pilot or flight engineer what is happening.

Referring now to Figs. 16 and 16a, which must be taken together inasmuch as Fig. 16a is a continuation of Fig. 16 and the latter figure must be placed above 16a, these two figures comprise the wiring diagram of the complete apparatus used in the embodiment of the invention shown in Figs. 4 and 4a, and also show diagrammatically the various elements comprising the apparatus, some of which are like those previously described in connection with the wiring diagram shown in Figs. 7 and 7a and others of which did not appear in Figs. 7 and 7a and will be described hereinafter as the description proceeds with respect to Figs. 16 and 16a.

In Figs. 16 and 16a, the wiring diagram is substantially the same as that shown in Figs. 7 and 7a but differs therefrom in that in the frequency and throttle selector switch 27 there are only six contacts in one of the sets which cooperates with the switch arm 110, and only two contacts in the other set which cooperates with switch arm 110, the contact 203 shown in Fig. 7a being eliminated in the one set, and contacts 199, 200, 201 and 203 shown in Fig. 7a being eliminated in the other set. Likewise lamp 170 which is associated with contact 116 of Fig. 7a is not used, and lamp 379 contained within the box 359 shown in Fig. 7a is also eliminated in Figs. 16 and 16a. Accordingly, the lead 178 which is shown in Fig. 7a connecting contact 116 to lamp 379 and to spring contact arm 174 of the frequency tuner 26 is not shown in Figs. 16 and 16a.

In this embodiment the contacts 184, 112, 113, 114, 115 and 117 of the frequency and throttle selector switch 27 are labeled M, A, B, C, 1 and 2, respectively, while the contacts 198, 202 and 204 are labeled M, 1 and 2, respectively, contacts 184 and 198 being arranged to be engaged simultaneously by the switch arm 110 when the latter is in its normal position, while contacts 115 and 202 are engaged by switch arm 110 when the latter is in position 1 and contacts 117 and 204 being engaged by switch arm 110 when the latter is in position 2.

Positions M, 1 and 2 are the three essential positions required for making an automatic landing in accordance with the embodiment of the invention shown in Figs. 4 and 4a for the reason that only two transmitting stations are used, namely, stations 1 and 2, the latter of which includes the non-directive radio transmitter 46 and beacon transmitter 72, while the former, namely station 1, corresponds to station 4 of Figs. 1 and 1a and consequently includes the marker beacon transmitter 59 and non-directive radio transmitter 51 with its antenna 55.

In all other respects the connections from the frequency and throttle selector switch 27 to the automatic throttle control 32, to the box 359 and to the frequency tuner 26 are the same in Figs. 16 and 16a as in Figs. 7 and 7a.

Another difference between the wiring diagram shown in Figs. 16 and 16a and that shown in Figs. 7 and 7a is that in Figs. 16 and 16a the rate of climb responsive device 256 and the altimeter 246a of Figs. 7 and 7a are eliminated, together with the altitude relay 251, rate of climb sensitive relay 265 and rate of climb power relay 282. In view of the fact that the altimeter relay 251 is eliminated, the switch 303 controlled by the coils 304 and 305 of relay 301 is also unnecessary.

As indicated in connection with the description of the embodiment of the invention shown in Figs. 4 and 4a, the aircraft is controlled to a landing by the glide path beam 73 projected by the beacon transmitter 72, and also by the components 74 and 75 of the runway localizer beam likewise projected by the beacon transmitter 72 at station 2 and, therefore, in lieu of the rate of climb responsive device 256 of Figs. 7 and 7a, there is substituted in Figs. 16 and 16a a glide path indicator 69a to control the automatic throttle control 32 so that the throttle valve 215 is controlled in such a manner as to maintain the speed of the craft at a gliding speed sufficient to maintain the craft on the glide beam 73.

The glide path indicator 69a comprises, as shown, a pointer 382 carried by coil 383 which is adapted to be energized from the output of the marker beacon receptor 28 (Figs. 4 and 4a) through a filter circuit associated therewith in a well-known manner in response to radiant energy received from the glide beam 73 transmitted by the beacon transmitter 72, whereby the pointer 382 is caused to move up or down in the event that the aircraft is above or below the glide beam 73. The pointer 382 is connected, as shown diagrammatically by the dotted line 384, to a relay 385 having a coil 386 and a movable contact 387 which is adapted to engage one or the other of a pair of fixed contacts 388 and 389 upon actuation of said movable contact 387 by the pointer 382. The coil 386 of the relay 385 is for the purpose of periodically interrupting said relay so as to give the pointer 382 an opportunity to properly position itself and, hence, the movable contact 387 of said relay 385 which is substantially like the directional relay shown in Fig. 8 except that the contacts 387, 388 and 389 do not control the circuit of an electric motor for adjusting a directional gyroscope but are arranged to control the "glide-cruise" vernier adjusting motor 297 of the automatic throttle control device 32 and, therefore, contact 388 is connected by means of a lead 390 to the lead 294 at the junction 391, the lead 294 being the one which is connected to the field coil 296 of the vernier adjusting motor 297. Likewise, fixed contact 389 of the relay 385 is connected by means of a lead 392 to the lead 295 at the junction 393, the lead 295 being the one which is connected to the field coil 298 of the vernier adjusting motor 297. The movable contact 387 of relay 385 is connected by lead 394 to the lead 245 at the junction 320, the lead 245 being the one which is connected to the spring contact arm 223 of the automatic throttle control 32, whereby said relay 385 is effective under the control of the glide path indicator pointer 382 when the throttle valve 215 is in the glide position. Since the movable contact 387 of the relay 385 is connected to the lead 245 it is likewise connected to contact 204 of the frequency and throttle selector switch 27 and, therefore, the glide path indicator 69a is in operation only when switch arm 110 of the selector switch 27 is in position 2, i. e., in engagement with contacts 117 and 204.

As stated in connection with the description of the embodiment of the invention shown in Figs. 4 and 4a, there is provided, in addition to the directional relay 22 a directional relay 69 which operates in response to energy received from the components 74 and 75 of the runway localizer beam projected by the beacon transmitter 72. Said directional relay 69 comprises, in the present embodiment, a pointer 395 carried by a coil 396 which is adapted to be energized from the runway localizer beacon receptor 70 in response to radiant energy received by the beacon receptor antenna 71 from said components 74, 75 of the runway localizer beam, whereby said pointer 395 moves to the left or right when the aircraft moves into the zone of the component 75 or the component 74, respectively. The pointer 395 is arranged to control a movable contact 397 of said relay 69 which is also substantially like the relay 22 shown in Fig. 8, the controlling connection between pointer 395 and movable contact 397 being shown diagrammatically by the dotted line 398. Upon actuation of the pointer 395, the movable contact 397 is adapted to engage one or the other of a pair of fixed contacts 399 and 400. A coil 401 is provided for periodically permitting the pointer 395 to assume the proper position in accordance with energy received by the coil 396, said coil 401 and the coil 386 of the glide path relay 385 functioning in the same manner as coil 80a of the directional relay 22. For the latter purpose the coil 401 of the relay 69 is connected by means of a lead 315b to the lead 315 at the junction 402, the lead 315 being the one which is connected to the switch 311 of the motor actuated circuit breaker 312. The coil 386 of relay 385 is likewise connected to the lead 315 by a lead 315a for the same purpose, namely, for periodic energization and deenergization thereof by operation of the switch 311 under the control of the motor actuated circuit breaker 312.

The directional relay 69 is provided for the purpose of obtaining corrections for drift while the aircraft is being guided towards station 2 along the glide beam 93 and, therefore, is arranged to rotate the loop antenna 24 in its proper direction with respect to the aircraft in order to control the aircraft on the proper heading in substantially the same manner as the loop 24 is rotated by the gyroscopic drift indicator shown in Figs. 11 to 14, inclusive. For this purpose the fixed contact 399 of the directional relay 69 is connected by means of a lead 403 to one end of a field winding 404 of a series electric motor 405, and fixed contact 400 of said directional relay 69 is connected by means of a lead 406 to the other end of the field winding 404 of the motor 405. In this manner the motor 405 is made to rotate in one direction or the other depending upon whether movable contact 397 engages either one or the other of the fixed contacts 399 and 400.

The movable contact 397 of directional relay 69 is connected by means of a lead 407 to the lead 394 at the junction 408, said lead 394 being connected, as previously indicated, to the lead 245 at the junction 320 so that by means of the leads 407, 394 and 245, the movable contact 397 of the directional relay 69 is connected to the lead 320a which is, in turn, connected to contact 204 of the frequency and throttle selector switch 27 and, therefore, the directional relay 69 is not effective until switch arm 110 of said selector switch 27 is in position 2, i. e., in engagement with the contacts 117 and 204, this being the position when the aircraft is guided toward station 2 at the end of the runway 44 on the landing field 20 in Figs. 4 and 4a.

An additional control is provided in the present embodiment, i. e., in the embodiment shown in Figs. 16 and 16a, namely, a control for actuating the ailerons 38 of the aircraft 19 in order to automatically bank the aircraft the proper amount and in the proper direction according to the rate and direction of turn of the craft. In the form shown, said means comprise a pendulous device 409 including a pendulum 410 pivoted at 411 for movement about the longitudinal axis of the craft in response to centrifugal forces acting on said pendulum 410 during a turn. The pendulum 410 is in the nature of a movable contactor adapted to engage one or the other of a pair of fixed contacts 412 and 413. The pendulum contactor 410 is connected by means of a lead 414 to the lead 196 at the junction 415a, the lead 196 being the "live" lead from master switch 195. Fixed contact 412 is connected by means of a lead 415 to one end of a field winding 416 of a reversible electric motor 417, while the other fixed contact 413 is connected by means of a lead 418 to the other end of the field winding 416 of the reversible electric motor 417. The reversible electric motor 417 may be connected in any suitable manner (not shown) to the aileron control of the automatic pilot 21, for actuating the ailerons 38 in the proper direction and the necessary amount to bank the craft the correct amount for a given rate of turn. When the aircraft is at the correct bank, then the pendulum contactor 410 will be in neutral position, i. e., out of contact with both fixed contacts 412 and 413, and the motor 417 will be stopped.

With reference to the wiring diagram of the complete system shown in Figs. 16 and 16a, the operation is as follows:

Normally, the switch arm 110 of the selector switch 27 is in the M position, i. e., in engagement with contacts 184 and 198, at which time the system is in condition for manual control through the various means previously described in connection with Figs. 7 and 7a.

When it is desired to make an automatic landing, the master switch 195 is closed to supply power to the entire system as in the case of the system shown in Figs. 7 and 7a. Then, either the advance switch 361 at the box 359 may be momentarily closed by the pilot or the advance switch 321 located in the selector switch 27, which usually is in the control room of a larger aircraft, may be momentarily closed by the flight engineer. The momentary closing of either advance switch 361 or advance switch 221 energizes the advance solenoid 105 to actuate the switch arm to position A, i. e., in engagement with contact 112 of the selector switch 27, it being understood that at this time the aircraft is flying at cruising speed at any altitude which may be desired by the pilot. Advancement of the switch arm 110 to the position A merely functions to automatically tune the radio compass receiver 23 by the frequency tuner 26 to a predetermined station, but no control is effected on the throttle through the automatic throttle control 32 for the reason that said control 32 is not in circuit at this time. The advance switch 361 or the advance switch 321 is actuated three more times, whereby the switch arm 110 of the frequency and throttle selector switch 27 is advanced to position 1, i. e., in engagement with contacts 115 and 202, whereupon lamps 169 and 378 will become illuminated to indicate to the pilot and the flight engineer that the radio compass 231 is tuned to the frequency of the transmitter at station 1 and that the aircraft is ready to go in for a landing.

While the switch arm 110 is in position 1 and the radio compass receiver 23 is tuned to the frequency of the transmitter at station 1, the automatic throttle control 32 is brought into operation by reason of the fact that contact 202 is connected by means of lead 239 to the altimeter relay 236 and from said relay 236 to the spring arm contacts 222 and 223, respectively, by means of the leads 234 and 235, thereby providing a control for moving the throttle to the glide position or the cruise position, depending upon the position of the movable contact 238 of the altimeter relay 236 as determined by the altimeter 243a which is set to control at an altitude of one thousand feet as in the embodiment shown in Figs. 7 and 7a. Accordingly, the aircraft 19 will be guided toward station 1 under the control of the directional relay 22 in response to the radiant energy received by the radio compass 23 from said station 1, and will be maintained at a constant altitude of one thousand feet under the control of the altimeter 243a and its associated relay 236.

The rate of climb responsive device 257 is provided to obtain a more sensitive control of the throttle at cruising speed and operates in the same manner as in Figs. 7 and 7a to actuate the vernier adjusting motor 297 for moving the contact carrier 300 to actuate contacts 226, 227 or 228, 229 into engagement with spring contact arms 222 or 223, respectively, until the throttle motor 212 has adjusted the throttle to the proper position for glide or cruise.

As the aircraft passes over station 1, the marker beacon receptor 28 receives radiant energy from marker beacon 59 and produces an impulse which energizes advance relay 105 of the selector switch 27, thereby causing the switch arm 110 to advance to position 2, i. e., into engagement with contacts 117 and 204, whereupon the radio compass 23 is immediately and automatically tuned to the frequency of the non-directive transmitter 46 located at station 2, and, at the same time, the automatic throttle control device 32 is put under the control of the glide path indicator 69 which becomes operative in response to energy received by the coil 383 from a filter circuit associated with the marker beacon receptor 28 in view of the fact that station 1 is located at a point where the glide beam 73 intercepts the beam from the marker beacon 59 at an altitude of one thousand feet. In other words, with the craft flying at a controlled altitude of one thousand feet, it will come onto the glide beam 73 at the instant that the craft passes over station 1 and intercepts the beam from the marker beacon 59.

Because of the fact that the switch arm 110 is in engagement with contact 204, the directional relay 69 is also rendered effective to control the loop rotating motor 405 in response to energization of said relay 69 by radiant energy received from the components 74 and 75 of the runway localizer beam by the runway beacon receptor 70 and its associated antenna 71. At this time the altimeter 243a and the rate of climb responsive device 257 are rendered ineffective together with their associated relays 246, 276 and 285.

In the event there is a cross wind and the aircraft tends to drift to the left or right of the runway localizer beam as defined by its components 74 and 75, the signals from these components will cause the pointer 395 of the directional relay 69 to be operated to the left or right, thereby energizing the loop rotating motor 405 to rotate the loop antenna 24 in such a manner as to correct for the drift. This will keep the aircraft headed directly to station 2 and also keep it within the "on-course" signal of the runway localizer beam.

The glide path relay 69a will control the throttle control device in such a manner that the aircraft will be guided accurately down the glide beam 73 until contact is made with the ground. When contact is made with the ground by either or both wheels of the landing gear, either one or the other or both of the landing gear switches 328, 329 will be closed to thereby energize the reset solenoid 121. Energization of the reset solenoid 121 in this manner will actuate the pawl 119 out of engagement with the ratchet wheel 109 of the selector switch 27, whereby the switch arm 118 will be returned to its normal M position by the spring 118, in which position the throttle is actuated by the throttle control device 32 to the "off" position in view of the fact that contact 198 of the selector switch 27 is connected to the spring arm contact 225 of the throttle control device 32 by means of leads 353 through the manually actuated throttle switch 337 contained in the control box 334, and from said switch 337 by means of lead 354 which goes directly to spring arm contact 225, it being understood that the manually actuated switch arm 348 of the switch 337 must be in engagement with fixed contact 349 which is the "throttle-off" contact. With the throttle in the "off" position the aircraft will roll to a stop along the runway 44 of the landing field 20.

There is thus provided a novel apparatus and system for automatic take-off, automatic flight and automatic landing of aircraft, and more particularly a novel combination comprising automatic means for controlling an aircraft about the three axes thereof, and means responsive to radiant energy transmitted to the aircraft from the ground for operating said automatic control means to effect automatic take-off and/or landing of the aircraft from and to a predetermined landing field.

Novel radio-responsive automatically operable means are also provided for automatically controlling an aircraft to guide the same from one radio transmitting station to another at a controllably decreasing altitude until the aircraft contacts the ground, and means effective upon the aircraft touching the ground to render said automatic means ineffective.

Although only two embodiments of the invention have been illustrated and described, various changes in the form, combination, construction and location of parts, which will now appear to those skilled in the art, may be made without departing from the scope of the invention. Reference is therefore to be had to the appended claims for a definition of the limits of the invention.

What is claimed is:

1. Apparatus for automatically controlling an aircraft during take-off, flight and landing, comprising, in combination with said aircraft, a plurality of radio transmitting stations on the ground and spaced in alignment along a predetermined line of flight to be followed by the aircraft during take-off and landing, certain of said transmitting stations including directive means for transmitting radiant energy directively in a vertical direction and non-directive means for transmitting radiant energy in all directions, the non-directive radiant energy transmitted by each of the certain stations having a frequency different from that transmitted by each of the other certain stations, means on said aircraft for maintaining level flight, means on said aircraft for maintaining it on a predetermined course, means on said aircraft for controlling the altitude thereof to maintain it at a predetermined altitude, means responsive to the non-directively transmitted radiant energy for controlling the course maintaining means, and selecting means sequentially responsive to the vertically transmitted radiant energy from each of said certain stations for controlling the first-mentioned radiant energy responsive means and the altitude controlling means to simultaneously preselect a predetermined altitude at which the aircraft is to fly, said selecting means including means to sequentially tune to a different frequency the means responsive to the non-directively transmitted radiant energy, whereby the aircraft is guided automatically from one station to the other at a decreasing altitude until the aircraft contacts the ground.

2. Apparatus for automatically controlling an aircraft during take-off, flight and landing, comprising, in combination with said aircraft, a plurality of radio transmitting stations on the ground and spaced in alignment along a predetermined line of flight to be followed by the aircraft during take-off and landing, certain of said transmitting stations including directive means for transmitting radiant energy directively in a vertical direction and non-directive means for transmitting radiant energy in all directions, the non-directive radiant energy transmitted by each of the certain stations having a frequency different from that transmitted by each of the other certain stations, means on said aircraft for maintaining level flight, means on said aircraft for maintaining it on a predetermined course, means on said aircraft for controlling the altitude thereof to maintain it at a predetermined altitude, means responsive to the non-directively transmitted radiant energy for controlling the course maintaining means, and selecting means sequentially responsive to the vertically transmitted radiant energy from each of said certain stations for controlling the first-mentioned radiant energy responsive means and the altitude controlling means to simultaneously preselect a predetermined altitude at which the aircraft is to fly, said selecting means including means to sequentially tune to a different frequency the means responsive to the non-directively transmitted radiant energy, whereby the aircraft is guided automatically from one station to the other at a decreasing altitude until the aircraft contacts the ground, and means effective upon the aircraft contacting the ground for rendering the entire automatic control ineffective.

3. In combination with an aircraft having an engine and a throttle for controlling said engine, means for selectively actuating said throttle to any desired one of a plurality of positions to obtain a desired speed of said aircraft, means including a radio compass for guiding said craft sequentially from one to another of a plurality of radio transmitting stations, means for tuning said radio compass to different frequencies, means for selectively actuating said tuning means to tune said radio compass from one frequency to another, and radiant energy responsive selecting means responsive to signals of a single frequency for simultaneously controlling said throttle actuating means and said tuning actuating means to simultaneously change the throttle position and the receiving frequency of the compass.

4. In combination with an aircraft having an engine and a throttle for controlling said engine, means for selectively actuating said throttle to any desired one of a plurality of positions to obtain a desired speed of said aircraft, means including a radio compass for guiding said craft sequentially from one to another of a plurality of radio transmitting stations, means for tuning said radio compass to different frequencies, means for selectively actuating said tuning means to tune said radio compass from one frequency to another, and radiant energy responsive selecting means responsive to signals of a single frequency for simultaneously controlling said throttle actuating means and said tuning actuating means to simultaneously change the throttle position and the receiving frequency of the compass, and manually actuated means for controlling said selecting means independently of its response to radiant energy, whereby said throttle and compass tuning means may be manually controlled at will through said selecting means.

5. In combination on an aircraft, a radio compass including means for tuning the same to different frequencies, means for actuating said tuning means, means controlled by said compass for guiding said aircraft toward a radio transmitting station transmitting at a frequency corresponding to that to which the compass is tuned, means for regulating the propelling force of said aircraft, an altimeter, means controlled by said altimeter for actuating said regulating means, selecting means for simultaneously controlling said first-mentioned and said second mentioned actuating means to tune said radio compass to a different frequency and to simultaneously adjust the propelling force regulating means to obtain a desired speed of said aircraft, whereby said aircraft is guided from one radio transmitting station to another at a desired speed and at a desired altitude, and means responsive to radiant energy transmitted in a vertical beam from a transmitting station on the ground as the aircraft passes thereover for actuating said selecting means.

6. An automatic control system for automatically landing an aircraft at a predetermined landing field along a predetermined runway thereon, comprising two or more spaced radio transmitting stations aligned with said runway, one of said stations being substantially at the beginning of the runway and another one being subtsantially at the end of the runway, means at the station at the beginning of the runway for directively transmitting radiant energy in a vertical direction and also for non-directively transmitting radiant energy in all directions, means at the station at the end of the runway for directively transmitting a directed beam along the runway and for directively transmitting a glide-path beam, means on said aircraft for regulating the propelling force of said aircraft, means responsive to the non-directive radiant energy transmitted by the station at the beginning of the runway for guiding said aircraft toward said station, means responsive to the vertically directed radiant energy transmitted by said station at the beginning of the runway for shifting the control of said guiding means from the non-directive radiant energy transmitted by said station at the beginning of the runway to the directive beam along the runway transmitted by the station at the end of the runway, and means responsive to the glide-path beam transmitted by said station at the end of the runway for actuating said propelling force regulating means, whereby said aircraft is guided to a landing along said glide-path beam at a gliding speed and within the side boundaries of the runway.

7. An automatic control system for automatically landing an aircraft at a predetermined landing field along a predetermined runway thereon, comprising a plurality of spaced radio transmitting stations aligned with said runway, at least one of said stations being substantially at the beginning of the runway, certain of said stations having means for directively transmitting radiant energy of a predetermined frequency in a vertical beam and means for non-directively transmitting radiant energy in all directions, the frequency of the non-directive transmitting means at each station being different, a radio compass on said aircraft including means for tuning said compass to the different frequencies of the non-directive transmitting means, means for actuating said tuning means to tune said compass to a desired frequency, means controlled by said compass for guiding said aircraft toward the station to which said compass is tuned, means for regulating the propelling force of said aircraft, means for actuating said regulating means to obtain a desired speed of said aircraft, selecting means movable to any one of a plurality of selecting positions for simultaneously controlling said compass tuning actuating means and said propelling force regulating actuating means, and means responsive to the directive radiant energy transmitted vertically by said certain transmitting stations as the aircraft passes over each of them, for actuating said selecting means from one selecting position to another, whereby said compass is tuned from the frequency of one station to that of another and the propelling force is regulated to obtain a desired speed, thereby guiding said aircraft from one station to the next at desired speeds until said aircraft lands on the runway at the landing field.

8. An automatic control system for automatically landing an aircraft at a predetermined landing field along a predetermined runway thereon, comprising a plurality of spaced radio transmitting stations aligned with said runway, at least one of said stations being substantially at the beginning of the runway, certain of said stations having means for directively transmitting radiant energy of a predetermined frequency in a vertical beam and means for non-directively transmitting radiant energy in all directions, the frequency of the non-directive transmitting means at each station being different, a radio compass on said aircraft including means for tuning said compass to the different frequencies of the non-directive transmitting means, means for actuating said tuning means to tune said compass to a desired frequency, means controlled by said compass for guiding said aircraft toward the station to which said compass is tuned, means for regulating the propelling force of said aircraft, means for actuating said regulating means to obtain a desired speed of said aircraft, selecting means movable to any one of a plurality of selecting positions for simultaneously controlling said compass tuning actuating means and said propelling force regulating actuating means, and means responsive to the directive radiant energy transmitted vertically by said certain transmitting stations as the aircraft passes over each of them, for actuating said selecting means from one selecting position to another, whereby said compass is tuned from the frequency of one station to that of another and the propelling force is regulated to obtain a desired speed, thereby guiding said aircraft from one station to the next at desired speeds until said aircraft lands on the runway at the landing field, and means rendered effective by physical contact of the aircraft with the ground for actuating said selecting means to a position in which it controls the propelling force regulating means to reduce the propelling force to such an extent as to permit the aircraft to come to a stop.

9. An automatic control system for automatically landing an aircraft at a predetermined landing field along a predetermined runway thereon, comprising a plurality of spaced radio transmitting stations aligned with said runway, at least one of said stations being substantially at the beginning of the runway, certain of said stations having means for directively transmitting radiant energy of a predetermined frequency in a vertical beam and means for non-directively transmitting radiant energy in all directions, the frequency of the non-directive transmitting means at each station being different, a radio compass on said aircraft including means for tuning said compass to the different frequencies of the non-directive transmitting means, means for actuating said tuning means to tune said compass to a desired frequency, means controlled by said compass for guiding said aircraft toward the station to which said compass is tuned, means for regulating the propelling force of said aircraft, means for actuating said regulating means to obtain a desired speed of said aircraft, selecting means movable to any one of a plurality of selecting positions for simultaneously controlling said compass tuning actuating means and said propelling force regulating actuating means, and means responsive to the directive radiant energy transmitted vertically by said certain transmitting stations as the aircraft passes over each of them, for actuating said selecting means from one selecting position to another, whereby said compass is tuned from the frequency of one station to that of another and the propelling force is regulated to obtain a desired speed, thereby guiding said aircraft from one station to the next at desired speeds until said aircraft lands on the runway at the landing field, and manually actuated means for controlling the actuation of said selecting means independently of its actuation in response to radiant energy, whereby the direction of flight and the propelling force of the aircraft may be manually controlled at will through said selecting means.

10. An automatic control system for automatically landing an aircraft at a predetermined landing field along a predetermined runway thereon, comprising a plurality of spaced radio transmitting stations aligned with said runway, at least one of said stations being substantially at the beginning of the runway, certain of said stations having means for directively transmitting radiant energy of a predetermined frequency in a vertical beam and means for non-directively transmitting radiant energy in all directions, the frequency of the non-directive transmitting means at each station being different, a radio compass on said aircraft including means for tuning said compass to the different frequencies of the non-directive transmitting means, means for actuating said tuning means to tune said compass to a desired frequency, means controlled by said compass for guiding said aircraft toward the station to which said compass is tuned, means for regulating the propelling force of said aircraft, means for actuating said regulating means to obtain a desired speed of said aircraft, selecting means movable to any one of a plurality of selecting positions for simultaneously controlling said compass tuning actuating means and said propelling force regulating actuating means, and means responsive to the directive radiant energy transmitted vertically by said certain transmitting stations as the aircraft passes over each of them, for actuating said selecting means from one selecting position to another, whereby said compass is tuned from the frequency of one station to that of another and the propelling force is regulated to obtain a desired speed, thereby guiding said aircraft from one station to the next at desired speeds until said aircraft lands on the runway at the landing field, and altitude responsive control means for controlling said propelling force regulating actuating means to control the altitude of the aircraft while flying from one station to another, said altitude-responsive means being rendered effective and ineffective by said selecting means in certain respective positions thereof.

11. In combination, an aircraft having an automatic pilot for controlling said craft about three axes, means for controlling the power of said craft for take-off, radiant energy transmitting means positioned on the axis of take-off, remote from the craft, radio receiving means on said craft for receiving the energy from said transmitting means, means on said craft responsive to the radiant energy received by said receiving means from said transmitting means for controlling said automatic pilot to steer said craft in a direction towards said transmitting means, other radiant energy transmitting means remote from said craft and directively transmitting energy in a vertical beam, and radiant energy responsive control means responsive to said vertically transmitted energy when the aircraft is in the field thereof for controlling said power controlling means for controlling the power of said craft to obtain a different but predetermined power of said craft after take-off.

12. In combination, an aircraft having an automatic pilot for controlling said craft about three axes, means for controlling the power of said craft for take-off, radiant energy transmitting means positioned on the axis of the take-off remote from the craft, radio receiving means on said craft for receiving the energy from said transmitting means, means on said craft responsive to the radiant energy received by said receiving means from said transmitting means for controlling said automatic pilot to steer said craft in a direction towards said transmitting means, other radiant energy transmitting means remote from said craft and directively transmitting energy in a vertical beam, radiant energy responsive control means responsive to said vertically transmitted energy when the aircraft is in the field thereof for controlling said power controlling means for controlling the power of said craft to obtain a different but predetermined power of said craft after take-off, and control means also responsive to said vertically transmitted energy for controlling the receiving means which are responsive to the energy from the first-mentioned transmitting means, whereby said automatic pilot is actuated to set the heading of the craft on a predetermined course.

13. In combination with an aircraft, an automatic control system comprising an automatic pilot for stabilizing the craft about its three axes, radio compass means on said craft for controlling said automatic pilot to guide said craft toward a selected radio station, means for selectively tuning said radio compass to the frequency of a desired radio station, power propulsion means for maintaining said craft in flight, means for varying the power output of said propulsion means, altitude-responsive means operative to control said power-output-varying means to maintain the altitude of said craft substantially constant and radiant-energy-responsive means responsive to radiant energy of a predetermined frequency transmitted directively in a vertical beam from a station on the ground when the aircraft is in the radiant energy beam operative for simultaneously setting said power-output-varying means in a predetermined position, rendering said altitude-responsive means effective to control power-output-varying means, and tuning said radio compass to the frequency of another selected radio station.

14. In combination with an aircraft, an automatic control system therefor comprising means for controlling the propulsive power of said aircraft to obtain a selected power output, means including a radio compass for guiding said aircraft along a predetermined course, said radio compass including a control means for selectively causing said compass to cooperate with a particular radio transmission station on said predetermined course and a radiant-energy-responsive control means responsive to radiant energy signals of a predetermined frequency transmitted from a station on the ground for selectively and simultaneously controlling said radio compass control means to cause said radio compass to cooperate with said particular radio station and to actuate said propulsive-power-controlling means to alter the propulsive power of said aircraft to a predetermined value.

15. In an automatic control system for aircraft, the combination with said aircraft comprising an engine for propelling said aircraft, throttle-control means for varying the power output of said engine, an automatic pilot for maintaining said aircraft in level flight, an automatic radio compass operatively connected to said automatic pilot to cause said aircraft to be directionally guided along a predetermined course, tuning means on said radio compass, a nondirectional radio transmitting station on the ground and located on said predetermined course, a marker beacon transmitter station on the ground radiating a signal field of predetermined frequency in the form of a vertical beam and located on said predetermined course in spaced relation with said first-named transmitting station, a marker beacon receiver responsive to the marker beacon transmitter frequency on said aircraft operative to receive energy directively radiated in a vertical plane by said marker beacon transmitter, means responsive to the signal received by said receiver, said means being operatively connected to said throttle-control means and to said radio-compass-tuning means to simultaneously actuate said throttle-control means to give a predetermined power output and to tune said radio compass to the frequency of said nondirectional transmitting station.

16. The structure as claimed in claim 15, including a rate-of-change-of-altitude-responsive means operatively connected to said throttle-control means and rendered operative by said marker-beacon-signal-responsive means to cause a further adjustment of said engine throttle in response to a variation of the rate of change of altitude from a predetermined value.

17. The structure as claimed in claim 15, including a rate-of-change-of-altitude-responsive device operatively connected to said throttle-control means to give a further adjustment to said engine throttle in response to variation in the rate of change of altitude from a predetermined value whereby when said marker-beacon-signal-responsive means causes said engine throttle to be set in a predetermined power glide position, said rate-of-change-of-altitude-responsive means maintains the rate of descent substantially constant.

18. In combination with an aircraft, power propulsion means for said aircraft, servomotor means for controlling the power output of said power propulsion means, a plurality of spaced stations on the ground aligned with the axis of a landing runway, each of said stations having a nondirectional radio compass transmitter and a directional marker beacon transmitter, the latter radiating energy at a predetermined frequency in a vertical beam, each of said radio compass transmitters having a different output frequency, an automatic radio compass on said aircraft, directional aircraft control means actuated by said radio compass to guide said aircraft towards a selected one of said stations, marker-beacon-signal-responsive means on said aircraft responsive to the signals of any one of said marker beacon transmitters when in the field radiated therefrom, means sequentially controlled by said marker-beacon-signal-responsive means for controlling said radio compass to direct the flight of said aircraft towards each successive station, and means sequentially controlled by said marker-beacon-signal-responsive means operative to cause said servomotor means to control the power output of said power propulsion means to maintain a substantially constant predetermined altitude in flight between certain of said stations and to regulate the power output of said propulsion means, after said aircraft passes over a predetermined one of said certain stations, to cause a descent of said aircraft at a substantially constant rate until said aircraft contacts the ground.

19. The structure as claimed in claim 18, including means operative upon contact of the aircraft with the ground to render said power propulsion means ineffective to propel said aircraft.

20. In an automatic control system for aircraft, engine-power-output-control means, a directional control means for said aircraft, an automatic radio compass operatively connected to said directional control means for guiding said craft along a predetermined course, said radio compass including a tuning means operative to cause said radio compass to be responsive to the signals of a predetermined radio station located on said predetermined course, a marker beacon transmitter located on said predetermined course and radiating signals of a predetermined frequency in a vertical beam, marker-beacon-signal-responsive means on said aircraft responsive to signals of said predetermined frequency when the aircraft passes into said vertical beam, engine-power-output-control means, means for selectively positioning said power-output-control means in any one of a plurality of predetermined positions, one of said postiions corresponding to a power gliding output of said engine, rate-of-change-of-altitude-responsive means connected to said power-output-control means to actuate the same to maintain a predetermined rate of descent of the aircraft, and means controlled by said marker-beacon-signal-responsive means in response to radiant energy received from said marker beacon transmitter to actuate said radiocompass-tuning means to tune said radio compass to cooperate with said predetermined radio station and simultaneously actuate the selective positioning means for the said power-output-control means to cause the latter to be positioned in the said power gliding position and to render said rate-of-change-of-altitude-responsive means effective to cause an additional control on said power-output-control means to maintain the rate of descent of said aircraft substantially constant.

CARL J. CRANE.
GEORGE V. HOLLOMAN.
RAYMOND K. STOUT.
CONSTANTIN D. BARBULESCO.